US012785936B1

(12) United States Patent
Ahmad

(10) Patent No.: US 12,785,936 B1
(45) Date of Patent: Nov. 3, 2026

(54) ENCRYPTED MEDICAL IMAGING SYSTEM AND METHOD OF USE

(71) Applicant: PRINCE MOHAMMAD BIN FAHD UNIVERSITY, Dhahran (SA)

(72) Inventor: Jawad Ahmad, Dhahran (SA)

(73) Assignee: PRINCE MOHAMMAD BIN FAHD UNIVERSITY, Dhahran (SA)

( * ) Notice: Subject to any disclaimer, the term of this patent is extended or adjusted under 35 U.S.C. 154(b) by 0 days.

(21) Appl. No.: 19/635,208

(22) Filed: Mar. 31, 2026

(51) Int. Cl.
*H04L 9/06* (2006.01)
*H04L 9/00* (2022.01)

(52) U.S. Cl.
CPC ............ *H04L 9/0656* (2013.01); *H04L 9/001* (2013.01)

(58) Field of Classification Search
CPC .............................. H04L 9/0656; H04L 9/001
See application file for complete search history.

(56) References Cited

U.S. PATENT DOCUMENTS

| | | | | |
|---|---|---|---|---|
| 12,417,620 | B2 | 9/2025 | Gani et al. | |
| 12,469,283 | B2 | 11/2025 | Munoz Delgado | |
| 2004/0202326 | A1* | 10/2004 | Chen | H04L 9/001 380/263 |
| 2004/0223616 | A1* | 11/2004 | Kocarev | H04L 9/001 380/263 |
| 2020/0163641 | A1* | 5/2020 | Amit | A61B 6/12 |
| 2024/0062543 | A1* | 2/2024 | Munoz Delgado | G06V 10/82 |
| 2025/0078276 | A1* | 3/2025 | Zhou | G06T 7/0014 |

FOREIGN PATENT DOCUMENTS

| | | | |
|---|---|---|---|
| CN | 101394266 | B | 12/2010 |
| CN | 114157408 | B | 7/2024 |

OTHER PUBLICATIONS

Aggarwal et al. ("Deep learning based Image Compression, Encryption, and Recovery using Chaotic map and Compressive sensing", Feb. 2025, International Conference on Emerging Systems and Intelligent Computing, pp. 245-250) (Year: 2025).*
Wu et al. ("Medical Image Encryption by Content-Aware DNA Computing for Secure Healthcare", Jul. 2022, IEEE Transactions on Industrial Informatics, vol. 19, No. 2, pp. 2089-2098) (Year: 2022).*

(Continued)

*Primary Examiner* — Kenneth W Chang
(74) *Attorney, Agent, or Firm* — Oblon, McClelland, Maier & Neustadt, L.L.P.

(57) ABSTRACT

A secure medical imaging system includes a medical imaging device, an adjustable patient positioning fixture, a digital imaging encryption module, and a receiving device having a display. The system utilizes a digital imaging encryption module to transform a digital medical image into a latent image representation by partitioning the digital medical image into non-overlapping patches, encoding each of the non-overlapping patches using a quantum-assisted autoencoder, generating a chaotic control sequence from a cryptographic key using a nonlinear chaotic map and encrypting the latent image representation by applying a plurality of encryption operations controlled by the chaotic control sequence. The encryption operations include a permutation operation, a substitution operation, and a diffusion operation thereby producing an encrypted representation of the digital medical image.

9 Claims, 12 Drawing Sheets

(56) References Cited

OTHER PUBLICATIONS

Uğur Erkan, et al., "An image encryption scheme based on chaotic logarithmic map and key generation using deep CNN", Multimedia Tools and Applications, vol. 81, Jan. 26, 2022, pp. 7365-7391.
Mohit Dua, et al., "Medical image encryption using novel sine-tangent chaotic map", e-Prime-Advances in Electrical Engineering, Electronics and Energy, vol. 9, Jun. 19, 2024, 100642, 21 pages.

* cited by examiner

ENCRYPTED MEDICAL IMAGING SYSTEM AND METHOD OF USE

BACKGROUND

Technical Field

The present disclosure relates generally to a system and method providing encrypted medical imaging data based on a cryptographic protection strategy and which generates encrypted medical image data for analysis and display.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Medical devices and data derived therefrom are now routinely generated by and used in Internet-of things devices connected to the cloud or edge computing platforms. As a consequence, large amounts of personal and medical data are transmitted by wire and wirelessly thereby subjecting the data to risk of release. Other devices, including sensing platforms and ordinary, mobile devices may also capture and transmit large amounts of personal data, including personal medical data. Conventional machine learning and decryption techniques can rapidly identify and qualify medical images and associate such images with individual personal identifying data. In the absence of advanced protection means such as encryption methods and systems, the protection of this data is not optimal.

Modem medical imaging and analysis systems generate large amounts of images and data that must be associated with individual patients. The data is often transmitted between devices and to the cloud. Medical facilities, such as hospitals and urgent care locations must have the capability to rapidly transmit visual data streams both internally and outside for viewing and analysis by experts who may not be on site. These medical imaging data can include imaging scans, private medical diagnoses, treatment outcomes, and the like. Such information, because it is associated with a specific individual (patient), must be insured confidentiality.

The secure medical imaging system of the present disclosure applies encryption strategies that address deficiencies of conventional systems. One such deficiency is the need to operate on dimensional pixel matrixes. This in turn requires substantial computing time and computer resources. This is especially acute for medical imaging data which must be a high-quality and resolution. Encrypting such pixel-level data may subject the data to weaknesses and susceptibility for attack and description.

Conventional image encryption techniques are commonly used to transform a digital image into an unintelligible form that can only be reconstructed with cryptographic keys. Conventional image encryption methods frequently rely on classical cryptographic primitives or chaotic systems to perform operations such as pixel permutation, substitution, and diffusion. For example, a chaotic map is used to generate pseudorandom sequences that drive pixel-level encryption operations. These operations may include scrambling pixel positions, modifying pixel values, and diffusing pixel information across the image to obscure statistical relationships between neighboring pixels.

Chaotic cryptographic systems conventionally use nonlinear chaotic maps as basis for generating key streams used for encrypting image data. CN101394266B discloses a chaotic signal generation technique used to produce pseudorandom sequences that can serve as encryption keys in secure communication systems. In this approach, chaotic mappings are used to generate signals whose dynamic parameters vary through nonlinear processes. The process described in CN101394266B produces complex sequences that can be used as key streams in encryption and decryption modules to protect transmitted information. The process addresses chaotic signals as a basis for enhancing randomness properties of encryption systems but operates on pixel-level image data that often requires repeated iterations of chaotic processes to achieve desired security characteristics.

CN114157408B describes a method for digital image encryption that uses a chaotic system to iteratively generate pseudorandom sequences for pixel diffusion and scrambling operations. Chaotic mapping function is initialized using parameters derived from an encryption key and the hash value of the input image. The chaotic map is iterated to generate sequences that drive diffusion and scrambling operations applied to the image pixels, thereby producing an encrypted image. The process of CN114157408B also preferentially operates on the original pixel matrix of the image thus relies heavily on iterative chaotic computations which leads to computational demands and inefficiencies.

In certain fields such as surveillance, hybrid image encryption techniques that combine chaotic maps with machine learning or neural network models have been applied. A chaotic logarithmic map can be used together with a deep convolutional neural network for key generation and encryption control. The neural network generates keys or parameters that control the chaotic system used for performing permutation, diffusion, and bit manipulation operations on the pixels of an image. The resulting encryption pipeline typically includes operations such as pixel permutation, DNA encoding, diffusion, and bit-level manipulations to produce the encrypted image representation, to the process enhances security by combining chaotic dynamics with learning-based models but performs directly on raw pixel data thereby retaining a record of statistical redundancies present in the data or sample structure.

Sine-tangent chaotic maps have been applied in the context of medical imaging. In this respect chaotic sequences are first generated mathematically. The sequences are then used with permutation and substitution operations to aspects of the data sample, e.g., in the case of images red, green, and blue color channels. A combination of chaotic sequences, keys, and exclusive OR operations can generate a cipher image to conceal the original image information. The process suffers from reliance on one-dimensional chaotic maps that operate directly on a pixel-level structure. As a consequence, unpredictability is limited thus rendering the process susceptible to cryptanalytic attacks.

U.S. Ser. No. 12/469,283B2 describes a system in which an image is divided into a set of non-overlapping patches that are processed by a transformer-based network to produce tokenized representations of the image patches. These tokens represent encoded features of the image and may be manipulated to generate variations of the original image. Similarly, U.S. Ser. No. 12/417,620B2 describes a training framework for vision transformer models in which input images are partitioned into sequences of non-overlapping patches that are treated as tokens for machine learning processing. In such architectures, patch-level representations are generated to facilitate deep learning operations such as feature extraction and classification. While these techniques may rely on advanced machine learning and computer vision to transform images into alternative representations for tasks such as recognition, classification, and semantic manipulation, they are principally used for visual understanding and classification tasks rather than cryptographic protection of image data.

Accordingly, there remains a need for a system that can accommodate and position a patient for acquisition of medical data in an encrypted digital form thereby providing cryptographic protection for medical data that may contain confidential information. The system provides resistance to cryptanalytic attacks and permits quick transformation of image data into encrypted representations suitable for storage or transmission across distributed computing environments. The system addresses drawbacks and deficiencies of conventional pixel-level and chaotic encryption systems.

SUMMARY

In an exemplary embodiment, a system for providing secure medical data is described. The system includes a medical imaging device, an adjustable patient positioning fixture, a digital imaging encryption module, and a receiving device comprising a display. The digital imaging encryption module comprises a processor and a memory that stores instructions to transform a digital medical image into a latent image representation by partitioning the digital medical image into a plurality of non-overlapping patches, encode each of the plurality of non-overlapping patches using a quantum-assisted autoencoder, generate a chaotic control sequence from at least one cryptographic key using a nonlinear chaotic map, and encrypt the latent image representation by applying a plurality of encryption operations controlled by the chaotic control sequence. The plurality of encryption operations comprises at least one permutation operation, at least one substitution operation, and at least one diffusion operation, thereby producing an encrypted representation of the digital medical image, wherein the medical imaging device, the digital imaging encryption module, and the a receiving device are in wireless communication, and wherein the medical imaging device is mechanically connected to the an adjustable patient positioning fixture.

In an embodiment, computer instructions saved in memory further function to configure the system to derive a cryptographic key by applying a password-based key derivation function to a password and a salt, split derived key material into an encryption key and an authentication key, generate a nonce, and generate a pseudorandom byte stream using a cryptographic hash-based pseudorandom number generator.

In an embodiment, the system is processor and memory are further configured to deterministically partition the chaotic map output into a first control stream for the at least one permutation operation, a second control stream for the at least one substitution operation and a bit-shift operation, and a diffusion seed matrix for the at least one diffusion operation.

In an embodiment, the system is further configured to perform the plurality of encryption operations in an ordered sequence including permuting columns of the latent image representation using the chaotic control sequence, substituting pixel values using a dynamically selected substitution box controlled by the chaotic control sequence, permuting rows of the latent image representation using the chaotic control sequence, and diffusing pixel values by circularly shifting bits and performing a bitwise exclusive-OR with the diffusion seed matrix.

In an embodiment, the latent image representation comprises a structured latent image that is encrypted in place of encrypting individual pixel values of the digital image.

In an embodiment, encoding each of the plurality of non-overlapping patches comprises processing each of the plurality of non-overlapping patches with a parameterized quantum circuit to produce a latent vector.

In an embodiment, the quantum-assisted autoencoder is configured to separate one or more retained latent components from a plurality of discarded components and to suppress the plurality of discarded components from the latent image representation.

In an embodiment, the nonlinear chaotic map comprises a sinusoidal-polynomial feedback chaotic map integrating a sinusoidal modulation, a polynomial nonlinearity, a state-dependent feedback, and a modular wrapping.

In an embodiment, the system is further configured to discard an initial transient portion of chaotic map output prior to using the chaotic control sequence.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
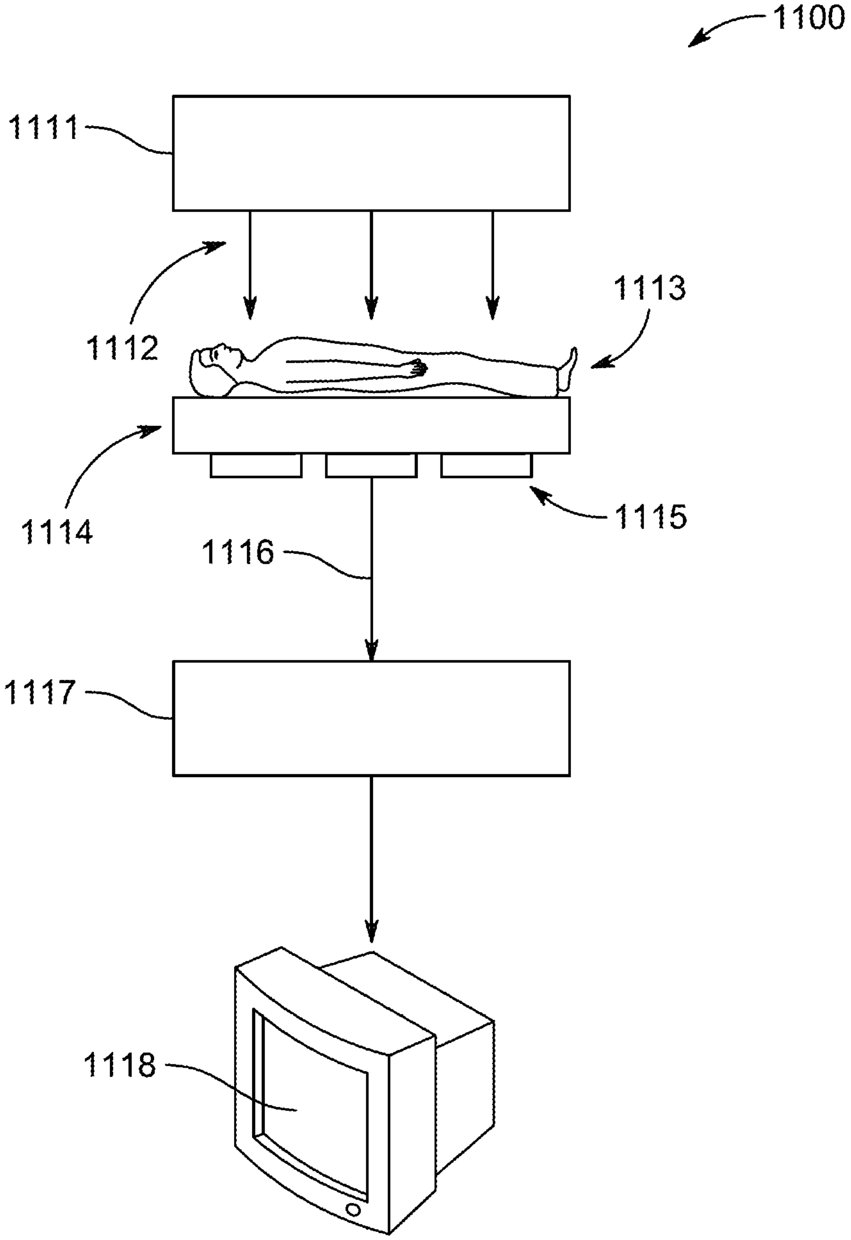
FIG. 1 is a schematic diagram of one aspect of the secure medical imaging system of the present disclosure.

In the drawings, like reference numerals designate identical or corresponding parts throughout the several views.

Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

The medical imaging device of the present disclosure may use electromagnetic, vibrational (e.g., sound) and/or magnetic radiation as a means by to generate a medical or clinical image of a patient or a portion of a patient. Visible light medical imaging includes obtaining digital video or still pictures of a skin surface, internal surface or an internal wound of a patient. Such applications include dermatology, wound care, and inspection of internal body cavities such as a stomach or a colon. The use of electromagnetic energy, including x-rays, permits inspection of structures underneath the skin that are otherwise not visible. Such methods include radiography, including fluoroscopy, magnetic resonance imaging (MRI), scintigraphy, tomography, positron emission tomography (PET) as examples. In addition to electromagnetic radiation, vibrations such as ultrasound can be used to collect medical image data. Energy is transmitted through the body of a patient and reflections therefrom used to create an image of internal body structure. A combination of techniques, such as photoacoustic imaging, tomography, echocardiography can be used for particular medical diagnosis. Imaging may be carried out on a molecular or atomic level such that concentrations of chemical materials or structures or elements are identified within a patient. In the context of the present disclosure, the medical imaging device is preferably MRI.

The data obtained from medical imaging may be viewed or projected onto a display device. The display device may present a direct or functionalized image of the data. For example, the data may be enhanced such that "hotspots" corresponding with concentrations of particular chemicals or tissues are highlighted. Such highlighting is carried out by enhancing the digital image. Data generated from the secure medical imaging system is typically transmitted to a display such as the screen of a computer. The data can also be transmitted to mobile devices such as tablets and mobile communication devices. Preferably the display device is used to display mainly the medical image data although other data may be displayed concurrently or separately with an medical image including, for example, patient information, resolution information, date stamp, and/or other explanatory or descriptive information.

The digital imaging encryption module ("encryption module") of the present disclosure is preferably embedded in and/or directly connected to and/or includes a processor with memory. The software or programming is preferably saved in memory. In some embodiments, the digital image encryption module is embedded on a separate processor and/or memory that is connected wirelessly or by wire to the medical imaging device. The module or modules of the present disclosure are preferably embedded in the memory of a processor.

The patient positioning system may include both small articles intended to immobilize and stabilize a particular portion of a patient's anatomy and full body devices. For example, a patient positioning fixture may include an arm, leg or neck brace that is intended to maintain a position and reduce mobility of a particular portion of the patient's body. Other patient positioning fixtures may include imaging tables that function to immobilize and/or stabilize several portions of a patient body; for example, immobilize both legs, both arms, neck and head, jaw, or an entire body. Patient positioning fixtures, in the context of the present disclosure, are preferably mechanical devices with adjustable height, width, and angle. The patient positioning fixture typically includes steppers, allowing small adjustments in positioning and/or articulation of the patient or any appendage of a patient during or prior to the collection of imaging data. The adjustable patient positioning fixture may include sensors embedded directly therein such that electromagnetic, or other imaging energy is captured and optionally processed directly on the patient positioning fixture. The digital imaging encryption module is optionally embedded in the medical imaging device and/or is preferably wirelessly connected to sensors present in the patient positioning fixture. The medical imaging device, such as MRI, may therefore be directly connected to the patient positioning fixtures to permit transfer of imaging rays and/or data.

Digital images are increasingly generated, transmitted, and stored across distributed computing environments such as smart surveillance systems, medical imaging infrastructures, industrial monitoring platforms, autonomous vehicles, and Internet-of-Things devices. Protecting such visual data against unauthorized access, interception, or tampering presents a significant technical challenge. Conventional image encryption approaches typically perform cryptographic operations directly on raw pixel values of an image. However, natural images exhibit strong spatial correlation and redundancy among neighboring pixels, which may lead to statistical leakage and predictable structural patterns even after encryption. In addition, direct pixel-level encryption of high-resolution images often results in substantial computational overhead, which limits the practicality of such techniques for real-time applications and resource-constrained platforms such as edge devices and embedded imaging systems.

The present disclosure addresses these limitations by introducing a secure medical imaging system that includes a digital imaging encryption module operating an encryption framework that first transforms an input digital image into a compact latent image representation before performing cryptographic operations. The image is partitioned into a plurality of non-overlapping patches and each patch is encoded using a quantum-assisted autoencoder to produce a structured latent representation of the image. By operating in the latent domain rather than directly on raw pixel values, the framework suppresses redundant and noise-dominated information while retaining semantically meaningful image features. This transformation significantly reduces statistical correlations within the data representation prior to encryption, thereby improving the effectiveness of subsequent cryptographic operations.

After generation of the latent image representation, encryption is performed using a chaotic control sequence derived from a nonlinear chaotic map. The chaotic map integrates multiple nonlinear mechanisms including sinusoidal modulation, polynomial nonlinearity, state-dependent feedback, and modular wrapping to produce a highly sensitive and unpredictable control sequence. The chaotic sequence is used to drive a structured confusion-diffusion encryption pipeline that performs permutation, substitution, and diffusion operations on the latent image representation. These operations systematically disrupt spatial structure and propagate changes throughout the representation, thereby producing a strongly randomized encrypted representation of the digital image.

Through the combination of representation transformation and chaos-driven cryptographic processing, the disclosed framework enhances both the efficiency and the security of image encryption systems. The use of patchwise quantum-assisted encoding reduces structural redundancy before encryption, while the nonlinear chaotic control sequence strengthens randomness and key sensitivity within the encryption process. As a result, the system provides improved resistance to statistical, differential, and brute-force attacks while remaining suitable for deployment in scalable imaging systems operating in edge computing, cloud computing, and distributed sensing environments.

FIG. 1 describes the secure medical imaging system of the present disclosure (1100) in one aspect. The secure medical imaging system includes a medical imaging device with an energy source (1111) such as x-rays or electromagnetic energy, for example (1112). Energy is a emitted from the energy source and penetrates, reflects from, or at least partially transmits through a patient (1113). The patient is mounted, set or present on an adjustable patient positioning fixture (1114). Sensors (1115) may be positioned below, on and/or inside the adjustable patient positioning fixture to capture transmitted energy, and/or may be present above the patient (1113) to capture energy reflected from the patient. Sensor data (1116) is transmitted by wire or wirelessly to a digital imaging encryption module (1117) for processing, encryption, de-encryption, enhancement or other manipulation. Images are subsequently displayed on the display (1118).

Figure 2:
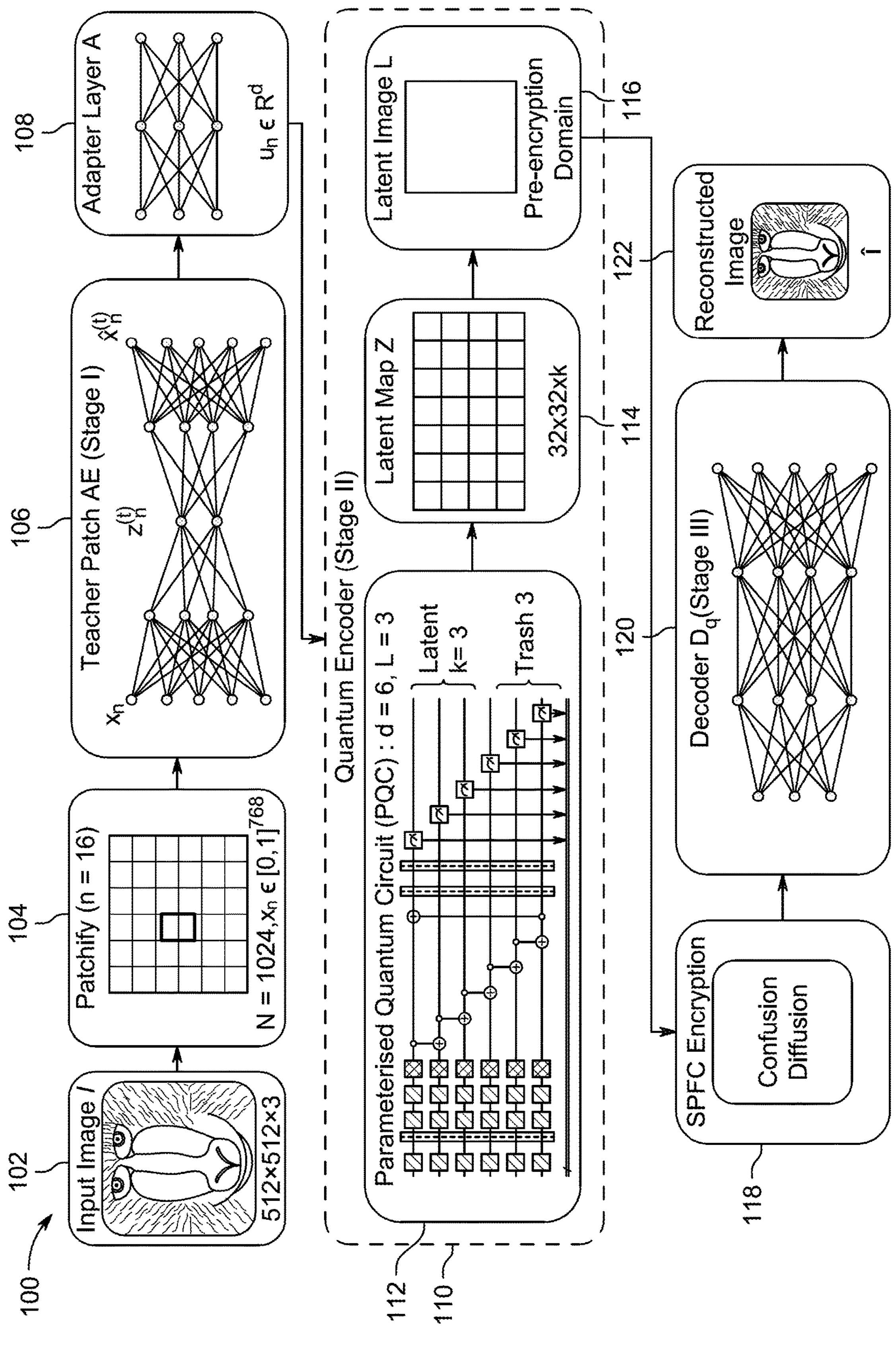
FIG. 2 is a schematic diagram of a quantum-assisted image encryption system (such as a digital imaging encryption module), according to certain embodiments.

FIG. 2 illustrates a digital imaging encryption module of the secure medical imaging system (including a quantum-assisted image encryption system) 100. The digital imaging encryption module (quantum-assisted image encryption system) 100, also referred to as the system 100, is configured to encrypt a digital image by transforming the digital image into a latent image representation, generating a chaotic control sequence from at least one cryptographic key using a nonlinear chaotic map, and encrypting the latent image representation by applying a plurality of encryption operations controlled by the chaotic control sequence, thereby producing an encrypted representation of the digital image. The digital imaging encryption module 100 preferably comprises three main modules, including a sinusoidal-polynomial feedback chaotic (SPFC) map that serves as a pseudo-random number generator (PRNG) to generate secure keys for the plurality of encryption operations; a hybrid patchwise quantum autoencoder (PQAE) that performs dimensionality reduction on the digital image to produce the latent image representation prior to encryption; and a chaotic image encryption module that applies the plurality of encryption operations to the latent image representation using the chaotic control sequence derived from the SPFC map. The PQAE makes the digital imaging encryption module 100 lightweight and efficient by operating the plurality of encryption operations on the compact latent image representation rather than on the individual pixel values of the digital image.

The digital imaging encryption module 100 comprises analysis and processing of an input image 1102. The input image 1102 is the digital image provided to the system 100 as the plaintext input. In the illustrated example, the input image 1102 has spatial dimensions of 512 by 512 pixels by 3 color channels, representing a full-color RGB image with pixel values normalized to the range [0, 1], denoted as $I \in [0, 1]^{512\times512\times3}$, although other image dimensions and channel formats may also be used. The digital imaging encryption module 100 may further include a patchify module 104 operably connected to the input image 1102. The patchify module 104 is configured to transform the digital image into the latent image representation by partitioning the digital image into a plurality of non-overlapping patches. A non-overlapping patch is a contiguous rectangular sub-region of the digital image that shares no pixels with any other patch, so that the plurality of non-overlapping patches tile the entire spatial extent of the digital image without gap or overlap. In the illustrated example, the patchify module 104 applies a patch size of p=16 pixels per side, partitioning the input image 1102 into N=1024 non-overlapping patches arranged in a 32 by 32 patch grid, although other patch sizes and patch counts may be used in other implementations. Each patch is vectorized into a patch vector $x_n$, where n is a patch index from 1 to N=1024, and $x_n \in [0, 1]^{768}$ is a 768-dimensional real vector encoding the flattened 16×16×3 pixel values of the patch.

The digital imaging encryption module 100 may further include a teacher patch autoencoder 106 operably connected to the patchify module 104. The teacher patch autoencoder 106 operates as a training-stage classical autoencoder i.e., Stage 1 of the digital imaging encryption module 100, and is configured to encode each patch vector $x_n$ into a compact teacher latent $z_n^{(t)}$, where the superscript (t) identifies the teacher network. In one example, the teacher patch autoencoder 106 produces a teacher latent $z_n^{(t)}$ of dimension $k_t$=4, consistent with a 4-dimensional final encoder layer, although other teacher latent dimensions may be used. The teacher patch autoencoder 106 provides stable target latent representations used to train the quantum encoder 110 through knowledge distillation, a training strategy in which the teacher model guides the student model to learn the same representational structure. The system 100 further includes an adapter layer A 108 operably connected to the teacher patch autoencoder 106. The adapter layer A 108 is a learned multilayer perceptron (MLP) that maps each teacher latent $z_n^{(t)}$ to a d-dimensional real vector $u_n \in \mathbb{R}^d$, dimensionally aligned with the qubit count d of the parameterized quantum circuit (PQC) 112. The adapter layer A 108 is trained jointly with the quantum encoder 110 during distillation.

The digital imaging encryption module 100 may further include a quantum encoder 110 operably connected to the adapter layer A 108. The quantum encoder 110 operates as Stage II 100 and is bounded by the dashed region in FIG. 2 enclosing the PQC 112, the latent map Z 114, and the latent image L 116. The quantum encoder 110 encodes each of the plurality of non-overlapping patches by processing each patch through the PQC 112 to produce a latent vector. The PQC 112 is a variational quantum circuit that operates on d=6 qubits initialized in the computational basis state $|0\rangle^{\otimes d}$, where $|0\rangle^{\otimes d}$ is the tensor product of d qubit ground states. The PQC 112 implements L=3 variational layers, each comprising parameterized single-qubit rotation gates applied to all d qubits followed by a ring entanglement layer of controlled-NOT (CNOT) gates, thereby forming a trainable parameterized unitary $U(u_n; \theta)$ where θ denotes the set of trainable variational parameters. For each patch, the d-dimensional adapter output $u_n$ is encoded as rotation angles in the input embedding layer of the PQC 112, and measurements of the d qubits after the L variational layers produce d classical values, such as expectation values associated with the measured qubits.

The quantum-assisted autoencoder of the digital imaging encryption module 100 is configured to separate, within the quantum-assisted autoencoder, one or more retained latent components from a plurality of discarded components and to suppress the plurality of discarded components from the latent image representation. The d measurement outcome values of the PQC 112 are partitioned into a latent register of k retained components and a trash register of d−k discarded components. In the illustrated example, k=3 measurement values are retained as the one or more retained latent components forming the quantum latent vector $\hat{z}_n^{(q)}$ per patch, where the circumflex identifies a quantum-derived latent estimate and the superscript (q) identifies the quantum encoder. The remaining d−k=3 measurement values constitute the plurality of discarded components and are suppressed from the latent image representation. The PQC 112 is trained so that the k retained components capture features of each patch used by the decoder Dq 120 for reconstruction, while the trash components represent information suppressed from the latent image representation.

The quantum encoder 110 further includes a latent map Z 114 operably connected to the PQC 112. The latent map Z 114 assembles the per-patch quantum latent vectors from all N=1024 patches into a structured three-dimensional tensor $Z \in \mathbb{R}^{32\times32\times k}$, where the 32 by 32 spatial dimensions correspond to the 32 by 32 patch grid and the k=3 third dimension corresponds to the k retained latent components per patch. The quantum encoder 110 further includes a latent image L 116 operably connected to the latent map Z 114. The latent image L 116 is formed by serializing the latent map Z 114 into a two-dimensional image-like representation by stacking the k latent channels along the width of the 32 by 32 patch grid. The latent image L 116 constitutes the pre-encryption domain of the digital imaging encryption module 100, as labeled in FIG. 2. The latent image representation formed by the latent image L 116 is a structured latent image that is encrypted in place of encrypting individual pixel values of the digital image. Operating the plurality of encryption operations on the pre-encryption domain of the latent image L 116 reduces the data volume subject to encryption and reduces spatial redundancy present in the digital image, thereby improving resistance to statistical analysis relative to direct pixel-level image encryption.

The digital imaging encryption module 100 further includes an SPFC encryption module 118 operably connected to the latent image L 116. The SPFC encryption module 118 is configured to generate the chaotic control sequence from the at least one cryptographic key using the nonlinear chaotic map and to encrypt the latent image L 116 by applying the plurality of encryption operations comprising at least one permutation operation, at least one substitution operation, and at least one diffusion operation, thereby producing an encrypted representation $I_c$ of the digital image. In the illustrated example, the SPFC encryption module 118 includes a confusion-diffusion encryption process, as shown in FIG. 2. The SPFC encryption module 118 derives the at least one cryptographic key by applying a password-based key derivation function to a password and a salt. In the illustrated example, the password-based key derivation function is PBKDF2-HMAC-SHA256, which applies the HMAC keyed hash using the SHA-256 algorithm to a user-supplied password and a randomly generated 128-bit salt S to derive a master key $K_{master}$, for example a 256-bit master key $K_{master}$. A hash-based key derivation function (HKDF) split then splits the derived key material into an encryption key $K_{enc}$ and an authentication key $K_{mac}$. A fresh 96-bit nonce N is generated per encryption to ensure forward secrecy. The encryption key $K_{enc}$ and the nonce are used to seed a cryptographic hash-based pseudorandom number generator (PRNG), which in one example is based on SHA-256, to produce a pseudorandom byte stream that is mapped to floating-point values in the open interval (0, 1) to initialize the SPFC map control parameters α, β, γ, δ, ε, ζ, and $y_0$. After initialization, an initial transient portion of the chaotic map output is discarded prior to using the chaotic control sequence, eliminating the influence of the startup transient on the usable cipher stream. The salt and nonce are stored in the ciphertext header, while $K_{enc}$ is never transmitted.

The nonlinear chaotic map of the SPFC encryption module 118 generates the chaotic control sequence using a sinusoidal-polynomial feedback chaotic map that integrates a sinusoidal modulation, a polynomial nonlinearity, a state-dependent feedback, and a modular wrapping. The polynomial nonlinearity is defined by the polynomial function $P(y_n)$ given as:

$$y_{n+1} = \mathrm{mod}(\sin(\pi \cdot (P(y_n) + \mathcal{B}(y_n))), 1) \tag{1}$$

In Equation (1), the expression sin $(\pi \cdot (P(y_n) + \mathcal{B}(y_n)))$ introduces significant non-linearity, thereby enhancing the map's complexity and chaotic behavior. The modulus operation guarantees that the map's output is constrained within the normalized range [0,1], ensuring cyclic behavior and boundedness.

The polynomial function P(y), is defined as:

$$P(y) = \alpha + \beta \cdot y + \gamma \cdot y^2 + \delta \cdot y^3 \tag{2}$$

Here, α, β, γ, and δ are coefficients that dictate the polynomial's behavior, each contributing to the polynomial's overall dynamical properties.

The state-dependent self-feedback mechanism, denoted as $\mathcal{B}(y)$, uses the map's current state to modulate its future states, creating a rich layer of complexity. It is defined as:

$$\mathcal{B}(y) = \varepsilon \cdot y \cdot \mathrm{mod}(y, \zeta) \tag{3}$$

where ε and ζ are parameters that fine-tune the feedback's influence, and in one example ζ typically set to 0.5 to define two operating regimes separated at $y_n$=0.5 that enhance the stretching and folding of the chaotic trajectory. The operator mod induces a piecewise re-wrapping of $y_n$ that gates the effective gain applied to $y_n$ inside the next-state map, altering the local slope of the map before the outer sinusoidal nonlinearity and the final modulo wrapping.

Let $y_n \in (0,1)$ denote the state of the map at iteration n. Hence, (2) and (3) can be represented as follows:

$$P(y_n) = \alpha + \beta y_n + \gamma y_n^2 + \delta y_n^3 \tag{4}$$

$$B(y_n) = \varepsilon \cdot y_n \cdot \mathrm{mod}(y_n, \zeta),\ \zeta \in (0, 1), \tag{5}$$

and the update rule is presented as:

$$y_{n+1} = \mathrm{mod}(\sin(\pi \cdot (P(y_n) + B(y_n))), 1) \tag{6}$$

where $y_n \in (0, 1)$ is the map state at iteration n, the sine function introduces the sinusoidal modulation, the absolute-value operation ensures a non-negative output, and the modulo 1 operation implements the modular wrapping that constrains the map output to the normalized range [0, 1]. The modular wrapping ensures cyclic behavior and boundedness of the chaotic trajectory.

The chaotic map output, after transient removal, is deterministically partitioned into a first control stream for the at least one permutation operation, a second control stream for the at least one substitution operation and a bit-shift operation, and a diffusion seed matrix C for the at least one diffusion operation, where the three-way partitioning minimizes cross-correlation among the control streams. In one implementation, the diffusion seed matrix is dimensioned or reshaped to correspond to the byte-domain representation used in the diffusion stage.

In this embodiment, $B(y_n)$ implements an instantaneous, state-dependent self-modulation of the current state $y_n$ rather than delayed feedback. The operator mod (•, ζ) induces a piecewise re-wrapping of $y_n$ that gates the effective gain applied to $y_n$ inside the next-state map. For $y_n \in (0,1)$ and ζ=0.5 used herein, $$\mathrm{mod}(y_n, \zeta)\begin{cases} y_n, & 0 \le y_n < \zeta \\ y_n - \zeta, & \zeta \le y_n < 1 \end{cases}$$

so that $B(y_n)=\varepsilon \cdot y_n \cdot \mathrm{mod}(y_n, \zeta)$ realizes a piecewise state-dependent gain that is multiplicatively coupled to $y_n$. This coupling alters the local slope of the map and creates two operating regimes separated by $y_n=\zeta$, which enhances stretching and folding before the outer sin(•) nonlinearity and the final modulo wrapping.

By integrating the polynomial dynamics P(y) with the feedback mechanism $\mathcal{B}(y)$ under the sinusoidal modulation, the proposed SPFC Map is defined as:

$$y_{n+1} = \mathrm{mod}(\sin(\pi \cdot (\alpha + \beta y_n + \gamma y_n^2 + \delta y_n^3 + \varepsilon y_n \cdot \mathrm{mod}(y_n, \zeta))), 1) \quad (7)$$

The SPFC encryption module 118 performs the plurality of encryption operations in an ordered sequence on the encoded latent image $I_e$, where $I_e$ is the encoded latent image corresponding to the latent image L 116 and produced by the quantum encoding operation of the PQAE. The ordered sequence comprises permuting columns of the latent image representation using the column permutation key $P_{col}$ derived from the first control stream, followed by substituting pixel values using a dynamically selected substitution box controlled by the S-box selection sequence $s_1 \in \{0, 1, 2\}$ derived from the second control stream, followed by permuting rows of the latent image representation using the row permutation key $P_{row}$ derived from the first control stream, followed by diffusing pixel values by circularly shifting bits by a key-dependent amount $s_2 \in \{0, 1, \ldots, 7\}$derived from the second control stream and performing a bitwise exclusive-OR (XOR) with the diffusion seed matrix $C^{256\times256}$.

The dynamically selected substitution box is selected from a plurality of cryptographic substitution boxes including the Advanced Encryption Standard (AES) substitution box, the *Camellia* substitution box, and the Khazad substitution box, so that $s_1=0$ selects the AES substitution box, $s_1=1$ selects the *Camellia* substitution box, and $s_1=2$ selects the Khazad substitution box.

The column permutation reduces horizontal spatial correlation with low computational overhead, the dynamic substitution introduces key-dependent nonlinearity and confusion, the row permutation disperses post-substitution correlation vertically, and the bit-shift followed by XOR with the diffusion seed matrix C implements bit-level diffusion, producing the encrypted representation $I_c$ of the digital image.

The digital imaging encryption module 100 may further include a decoder $D_q$ 120 operably connected to the SPFC encryption module 118. The decoder $D_q$ 120 operates as Stage III of the digital imaging encryption module 100 and is a compact MLP decoder configured to reconstruct the digital image from the decrypted latent image representation. In embodiments that support decryption, the encrypted representation Ic is decrypted by reversing the at least one permutation operation, the at least one substitution operation, and the at least one diffusion operation using the cryptographic key and the chaotic control sequence, thereby recovering the encoded latent image $I_e$.

The decoder $D_q$ 120 implements the mapping $D_q: \mathbb{R}^k \rightarrow \mathbb{R}^{768}$, reconstructing each 768-dimensional patch vector from the corresponding k-dimensional per-patch quantum latent of the decoded latent image representation. The N=1024 reconstructed patch vectors are reshaped and assembled through an unpatchify operation that reverses the partitioning of the patchify module 104, producing the full 512×512×3 reconstructed image.

The digital imaging encryption module 100 may further include a reconstructed image $\hat{f}$ 122 operably connected to the decoder $D_q$ 120. The reconstructed image $\hat{f}$ 122 is the digital image output of the digital imaging encryption module 100 at the authorized receiving side, where the circumflex accent identifies $\hat{f}$ as a decoded approximation of the input image 1102. The reconstructed image $\hat{f}$ 122 is produced for an authorized recipient possessing the password from which the at least one cryptographic key is derived, since an incorrect password produces a different chaotic control sequence and correspondingly different decryption results.

Figure 3:
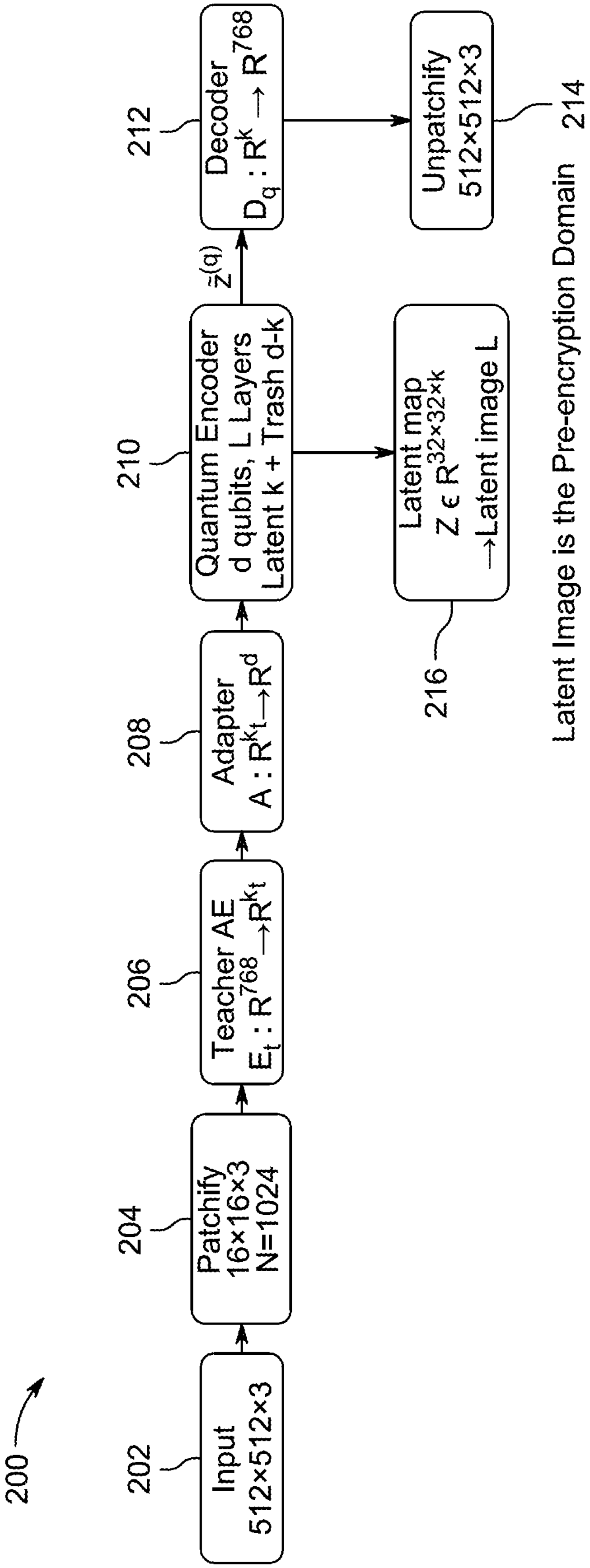
FIG. 3 is a schematic block diagram of a hybrid quantum autoencoder pipeline, according to certain embodiments.

FIG. 3 illustrates a hybrid quantum autoencoder (QAE) pipeline 200. The hybrid QAE pipeline 200 summarizes the complete mathematical dataflow of the hybrid patchwise quantum autoencoder (PQAE) module of the digital imaging encryption module 100. The hybrid QAE pipeline 200 comprises an input block 202, a patchify block 204, a teacher patch autoencoder block 206, an adapter block 208, a quantum encoder block 210, a latent map block 216, a decoder block 212, and an unpatchify block 214. The distillation of the teacher patch autoencoder block 206 and the fine-tuning of the decoder block 212 on quantum latents are the two training strategies used to obtain a stable quantum encoder and high-fidelity reconstruction, as labeled in FIG. 3.

The input block 202 receives the input image $I \in [0, 1]^{512\times512\times3}$ and passes it to the patchify block 204. The patchify block 204 applies non-overlapping patchification with patch size p=16 to produce a set of N=1024 RGB patches:

$$I \rightarrow_{patchify} \mathbb{P} = \{P_n\}_{n=1}^{N}, P_n \in [0, 1]^{16\times16\times3} \quad (8)$$

Each patch $x_n$ is a 768-dimensional vectorization of the 16×16×3 pixel block. The hybrid QAE processes all N=1024 patches independently using shared weights across the teacher patch autoencoder block 206, the adapter block 208, the quantum encoder block 210, and the decoder block 212.

Classical teacher patch autoencoder: The teacher patch autoencoder block 206 implements a lightweight classical encoder $E_t$: $\mathbb{R}^{768} \rightarrow \mathbb{R}^{k_t}$ that is first trained to produce stable target latent representations.

$$z_n^t = E_{t(x_n)} \in \mathbb{R}^{k_t} \tag{9}$$
$$\hat{x}_n^t = D_{t(z_n^t)} \in [0, 1]^{768}$$

In the illustrated example, the saved teacher checkpoint corresponds to $k_t=4$, consistent with the final encoder layer of the teacher patch autoencoder block 206 producing a 4-dimensional teacher latent $z_n^{(t)}$ per patch.

Learned adapter into the quantum encoder: The adapter block 208 implements a small learned multilayer perceptron (MLP) A: $\mathbb{R}^{k_t} \rightarrow \mathbb{R}^d$ that maps the teacher latent $z_n^{(t)}$ to a d-dimensional real circuit input:

$$u_n = A(z_n^t) \in \mathbb{R}^d \tag{10}$$

The adapter block 208 is trained jointly with the quantum encoder block 210 during knowledge distillation, aligning the classical latent space of the teacher patch autoencoder block 206 with the qubit-count-dimensional input space required by the parameterized quantum circuit (PQC) of the quantum encoder block 210.

Variational quantum encoder with latent/trash split: Given $u_n \in \mathbb{R}^d$, the PQC produces expectation values $$y_n = y(u_n, \theta) \in [-1, 1]^d \tag{11}$$

which are split into latent and trash registers:

$$y_n = [z_n^q t_n],\ z_n^q \in [-1, 1]^k,\ t_n \in [-1, 1]^{d-k} \tag{12}$$

The quantum encoder block 210 receives $u_n \in \mathbb{R}^d$ and processes it through the PQC operating on d qubits with L variational layers. The PQC produces d expectation values of the Pauli-Z observable measured on each qubit after the L variational layers, collected as:

$$\tilde{z}_n^q = \frac{z_n^q + 1}{2} \tag{13}$$

Classical decoder for reconstruction: A compact MLP decoder $D_{q(\cdot)}$ reconstructs patches from $$\tilde{z}_n^q:$$

$$\hat{x}_n = D_{q(\tilde{z}_n^q)} \in [0, 1]^{768} \tag{14}$$

Reconstructed patches are reshaped and unpatchified to form the final reconstructed image:

$$\hat{I} = \text{unpatchify}\left(\{\hat{P}_n\}_{n=1}^N\right) \in [0, 1]^{512\times512\times3} \tag{15}$$

Latent map construction and image-like serialization: Since the patch grid is 32×32, the per-patch quantum latents form a structured latent tensor:

$$Z \in [-1, 1]^{32\times32\times k},\ Z[i, j, :] = z^q_{n(i,j)} \tag{16}$$

For visualization and interfacing with downstream stages, we serialize Z into an image-like latent representation by stacking the k latent channels along width:

$$L = \text{reshape}(Z, 32, 32k) \in [-1, 1]^{32\times(32k)} \tag{17}$$

When a square representation is required, the image-like latent representation may be reshaped into a square representation, L to $L_\blacksquare \in [-1,1]^{64\times64}$, while preserving the total number of latent coefficients. Such reshaping is a deterministic re-indexing operation and does not alter the learned information content. With p=16 and (H, W)=(512,512), the latent tensor and its image-like serialisations have:

$$Z \in \mathbb{R}^{32\times32\times k},\ L \in \mathbb{R}^{32\times(32k)},\ L_\blacksquare \in \mathbb{R}^{64\times64} \text{ (for } k = 4 \text{ or an equivalent when } k = 3) \tag{18}$$

Figure 4:
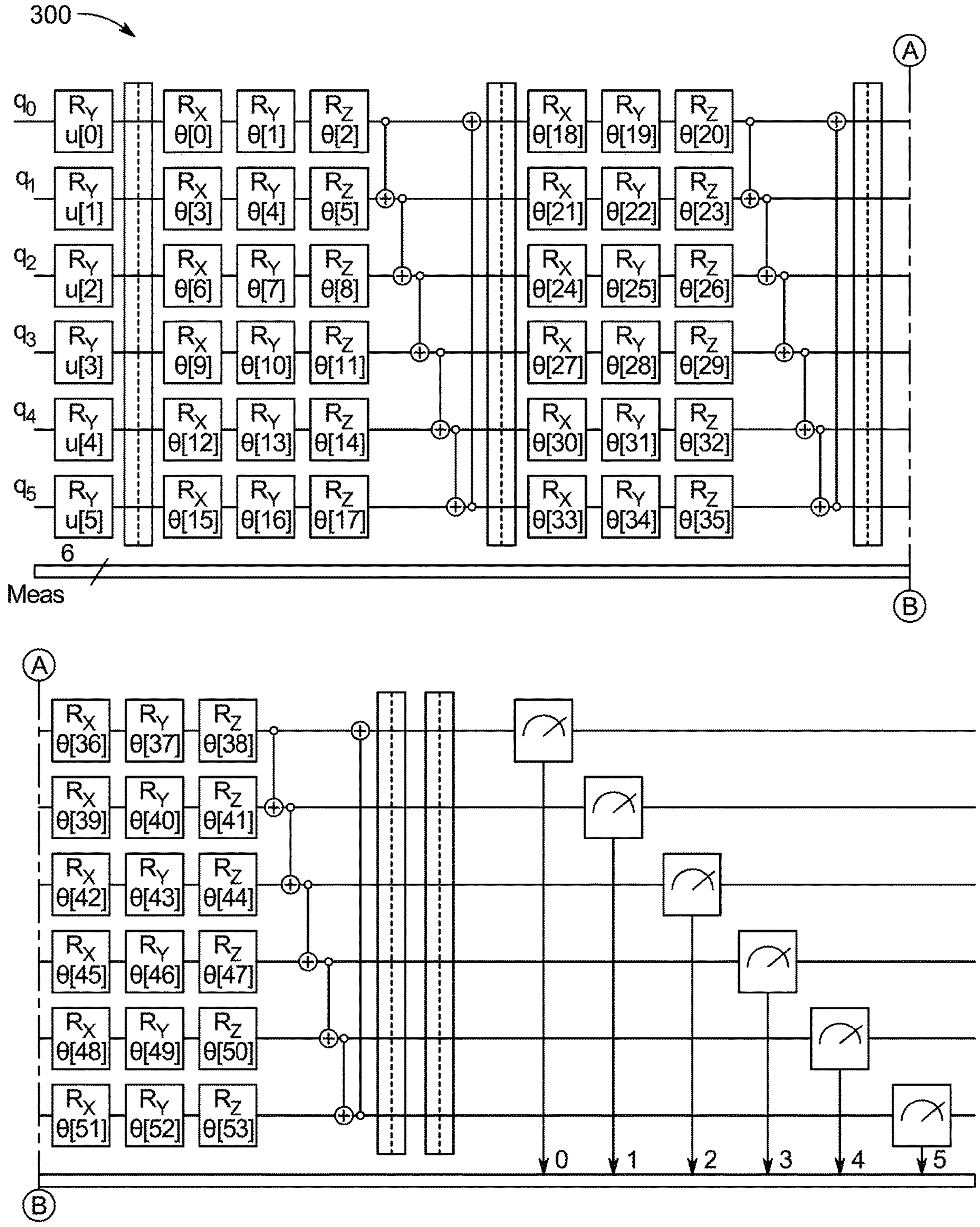
FIG. 4 is a schematic diagram of a full quantum patch encoder, according to certain embodiments.

FIG. 4 illustrates a full quantum patch encoder 300. The full quantum patch encoder 300 is the single-patch quantum encoder used in the quantum encoder block 210 of the hybrid QAE pipeline 200. The full quantum patch encoder 300 depicts the complete d-qubit variational quantum circuit (VQC), comprising an input embedding layer, a plurality of variational layers arranged in L repetitions, and a measurement layer with an explicit latent/trash partition, applied to one patch vector $u_n \in \mathbb{R}^d$ at a time. The same circuit, with shared trainable parameters θ, is applied to each of the N=1024 patch vectors independently.

The full quantum patch encoder 300 operates on d qubits initialized in the computational basis state $|0\rangle^{\otimes d}$, where $|0\rangle^{\otimes d}$ denotes the tensor product of d individual qubit ground states. The full quantum patch encoder 300 implements a parameterized unitary:

$$U(u, \theta): |0\rangle^{(\otimes d)} \rightarrow |\psi(u, \theta)\rangle \tag{19}$$

where θ denotes the set of trainable variational parameters and $|\psi(u_n; \theta)\rangle$ is the final d-qubit quantum state produced by the circuit. The full quantum patch encoder 300 is composed of three sequential circuit blocks, traversed from left to right across the qubit wires, as shown in FIG. 4.

The first circuit block is the input embedding layer, positioned at the leftmost portion of the full quantum patch encoder 300. The input embedding layer encodes each component of the d-dimensional adapter output $u_n$ as the rotation angle of a parameterized single-qubit gate applied to the corresponding qubit, mapping the classical patch information into the initial quantum state amplitudes of the d-qubit register. In the illustrated embodiment, the embedding layer applies a sequence of parameterized single-qubit rotations including $R_y(u_i)$, followed by trainable rotation gates $R_x(\theta)$, $R_y(\theta)$, and $R_z(\theta)$ on each qubit. The input embedding layer is applied once, to the initial state, before any variational layer is executed.

The second circuit block comprises L=3 repeated variational layers, depicted as L successive gate blocks across the d qubit wires in the full quantum patch encoder 300. Each variational layer contains parameterized single-qubit rotation gates applied to each qubit followed by an entanglement stage comprising controlled-NOT (CNOT) operations between neighboring qubits, as illustrated in FIG. 4. Each variational layer is identical in gate structure and is repeated L times with independent trainable parameters in each repetition. The structure of one variational layer is detailed in FIG. 5. The L=3 repeated variational layers collectively build up the expressivity of the parameterized unitary $U(u_n, \theta)$:, enabling the full quantum patch encoder 300 to learn a compact latent representation of each patch through training.

The third circuit block is the measurement layer, positioned at the rightmost portion of the full quantum patch encoder 300. The measurement layer performs measurements on all d qubits and produces d classical expectation values associated with the measurements of the Pauli-Z observable. The d measurement outcome values are partitioned into the latent register comprising the first k values and the trash register comprising the remaining d−k values, implementing the explicit latent/trash partition of the full quantum patch encoder 300. The k measurement values of the latent register are retained as the one or more retained latent components $\hat{z}_n^{(q)}$ that form the per-patch quantum latent vector for assembly into the latent map Z 114, while the d−k measurement values of the trash register constitute the plurality of discarded components suppressed from the latent image representation.

In one embodiment, the number of retained latent components k is smaller than the number of qubits d, such that the latent register represents a compressed quantum feature representation while the remaining d-k components are treated as discarded information.

Figure 5:
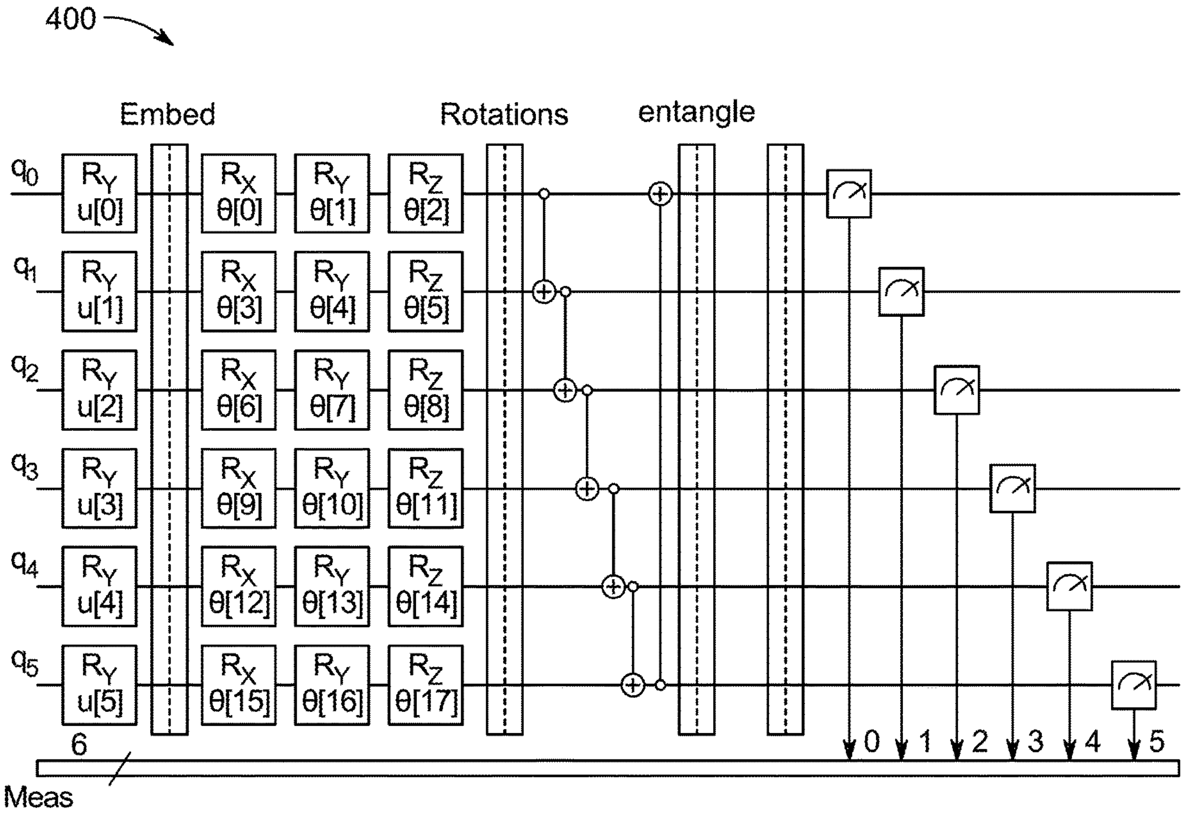
FIG. 5 is a schematic diagram of a single variational layer of the full quantum patch encoder, according to certain embodiments.

FIG. 5 illustrates a single variational layer 400. The single variational layer 400 is an exploded view of one variational layer of the full quantum patch encoder 300, revealing the internal gate structure that is repeated L times (e.g., L=3) in the full quantum patch encoder 300. The single variational layer 400 operates on d=6 qubit wires, labeled $q_0$ through $q_5$ from top to bottom, and a classical measurement register labeled 'Meas' at the bottom of the circuit. The single variational layer 400 illustrates the internal gate structure associated with one layer of the full quantum patch encoder 300, including single-qubit rotation operations and an entanglement section, with measurement symbols shown for explanatory completeness.

The embed section, at the leftmost position of the single variational layer 400, applies the data-encoding gates that map the components of the adapter output $u_n$ to qubit rotation angles. The embed section encodes the classical real-valued input $u_n \in \mathbb{R}^d$ into the quantum state of the d=6 qubit register, one component per qubit, preparing the register for the subsequent parameterized rotation and entanglement operations of the variational layer. In the illustrated embodiment, the embed section applies a set of single-qubit $R_y(u[i])$ rotations, where the value of each component of the vector $u_n$ determines the rotation angle applied to the corresponding qubit.

The rotations section, positioned to the right of the embed section in the single variational layer 400, applies a set of parameterized single-qubit rotation gates to all d=6 qubits independently. The parameterized single-qubit rotation gates of the rotations section are trainable gates whose rotation angles constitute a subset of the trainable variational parameters θ of the full quantum patch encoder 300. Applying independently parameterized rotations to all d=6 qubits enables the single variational layer 400 to rotate each qubit state to an arbitrary point on its Bloch sphere, producing qubit-local transformations before the entanglement step. In one example, the rotations section applies $R_x$, $R_y$, and $R_z$ rotation gates to each qubit, providing full single-qubit unitary control through three parameterized Euler-angle rotations. In the illustrated implementation, the rotations section applies a sequence of parameterized gates $R_x(\theta)$, $R_y(\theta)$, and $R_z(\theta)$ to each qubit, providing full single-qubit unitary control through three Euler-angle rotations.

The entangle section, positioned to the right of the rotations section in the single variational layer 400, applies a ring-structured entanglement layer of two-qubit controlled-NOT (CNOT) gates across all d=6 qubits. A CNOT gate is a two-qubit quantum gate that applies a Pauli-X (NOT) operation to a target qubit conditioned on the state of a control qubit, creating quantum entanglement between the two qubits. The ring entanglement layer connects qubit $q_0$ as control to qubit $q_1$ as target, qubit $q_1$ as control to qubit $q_2$ as target, and so on through qubit $q_4$ as control to qubit $q_5$ as target, and finally qubit $q_5$ as control back to qubit $q_0$ as target, completing the ring topology. The ring entanglement topology couples the d=6 qubits through controlled-NOT operations, enabling the full quantum patch encoder 300 to model correlations among components of the adapter output $u_n$ through entanglement-assisted processing. This entanglement-assisted processing contributes to generation of a nonlinear, quantum-derived latent representation for each patch.

The measurement symbols at the right end of the single variational layer 400 indicate the final measurement operation associated with the full quantum patch encoder 300. In the context of the full quantum patch encoder 300, measurement is performed only after all L=3 repetitions of the single variational layer 400 have been executed, so that the measurement symbols shown in the single variational layer 400 represent the final measurement step of the full quantum patch encoder 300 rather than an intermediate measurement within a single variational layer. The L=3 repetitions of the single variational layer 400 are concatenated without intermediate measurements, so that the quantum state remains coherent across all L repetitions and the full parameterized unitary $U(u_n; \theta)$ acts on the d=6 qubit register before any classical output is extracted.

Figure 6:
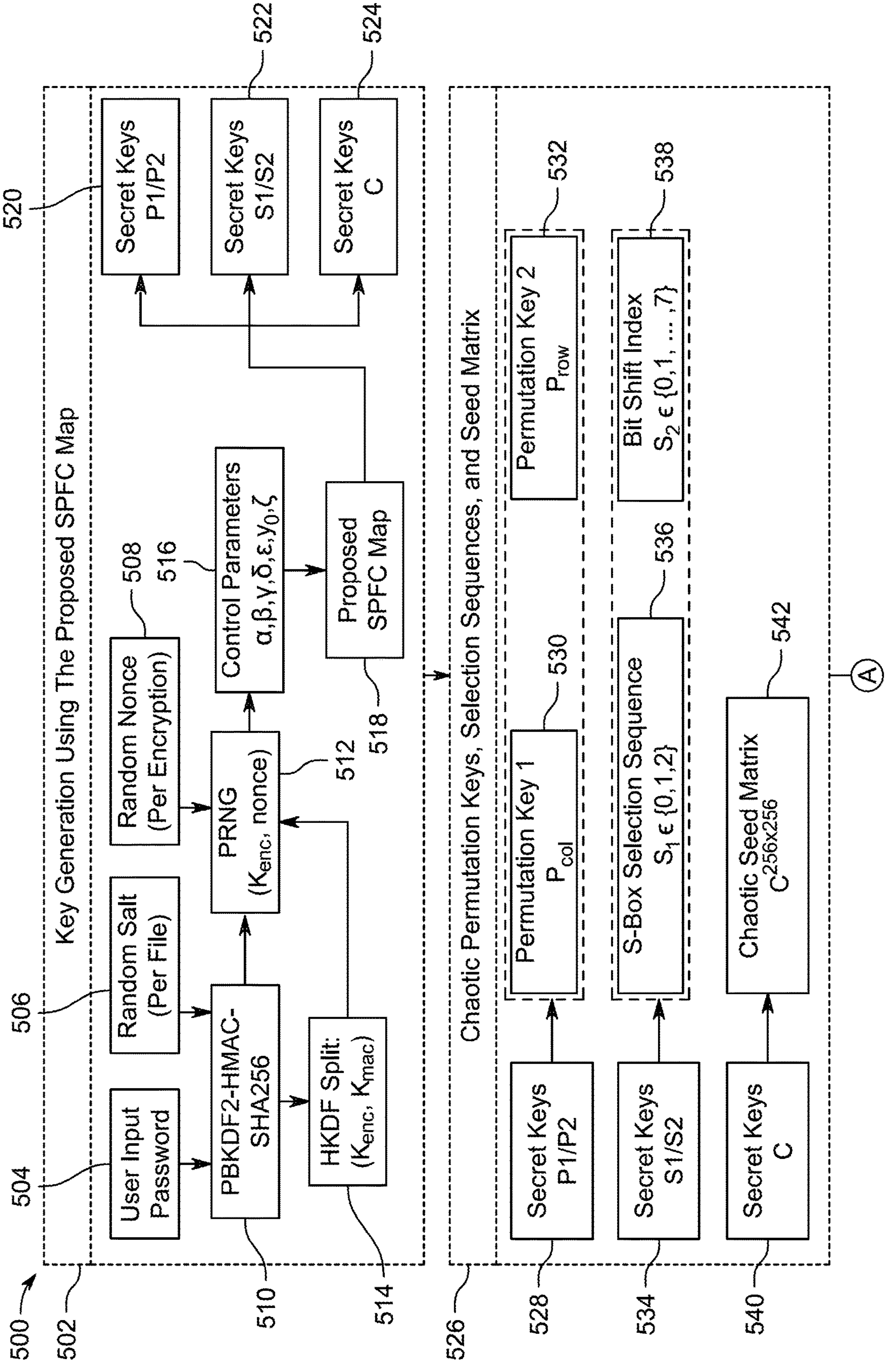
FIG. 6 is a schematic diagram of a quantum-assisted image encryption algorithm, according to certain embodiments.
Figure 6:
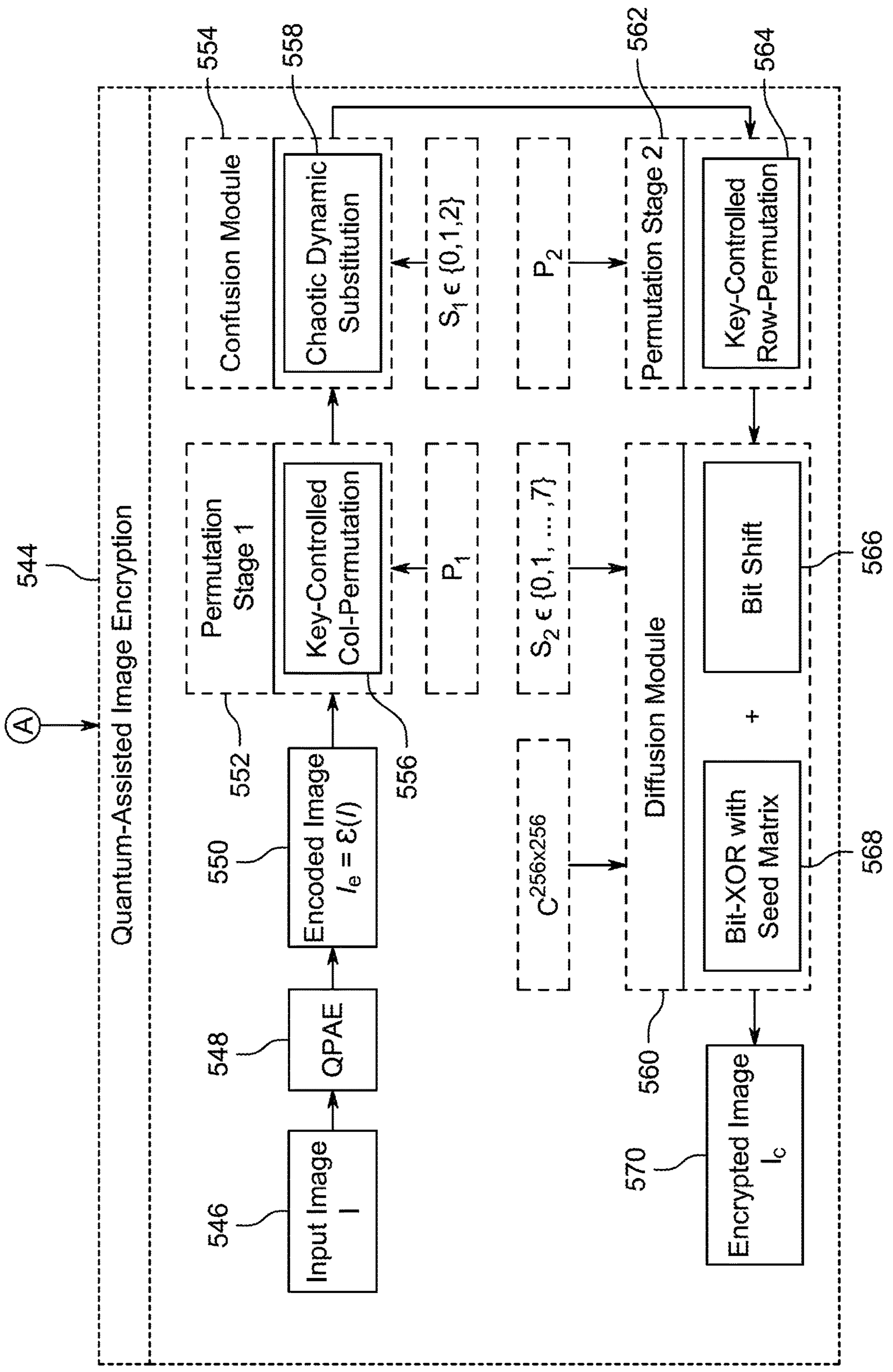

FIG. 6 illustrates a quantum-assisted image encryption algorithm 500. The quantum-assisted image encryption algorithm 500 depicts an encryption pipeline of the system 100, comprising three panels arranged vertically in FIG. 6. The first panel is a key generation panel 502, labeled "Key Generation Using The Proposed SPFC Map," that depicts the derivation of the at least one cryptographic key and the initialization of the sinusoidal-polynomial feedback chaotic (SPFC) map used as a pseudorandom number generator (PRNG). The second panel is a key derivation panel 526, labeled "Chaotic Permutation Keys, Selection Sequences, and Seed Matrix," that depicts the deterministic partitioning of the SPFC map output into the role-specific secret keys for the plurality of encryption operations. The third panel is an encryption panel 544, labeled "Quantum-Assisted Image Encryption," that depicts the application of the plurality of encryption operations to the encoded latent image produced by the quantum-assisted autoencoder (PQAE) 548. The sequence of operations across the three panels produces the encrypted representation $I_c$ 570 of the digital image from the input image I 546.

The key generation panel 502 depicts the derivation of the at least one cryptographic key by applying a password-based key derivation function to a password and a salt. The key generation panel 502 receives three inputs: a user input password 504, a random salt 506, and a random nonce 508. The user input password 504 is the user-supplied master secret that seeds the key derivation pipeline. The random salt 506 is a randomly generated 128-bit value produced once per file, stored in the ciphertext header, and combined with the user input password 504 to ensure that two encryptions performed under the same password but with different salts produce independent derived keys, preventing precomputation attacks. The random nonce 508 is a randomly generated 96-bit value produced once per encryption, stored in the ciphertext header alongside the random salt 506, and used to ensure forward secrecy so that two encryptions of the same input image under the same password produce different chaotic control sequences. The user input password 504 and the random salt 506 are processed by PBKDF2-HMAC-SHA256 510. PBKDF2-HMAC-SHA256 510 is the password-based key derivation function that applies the HMAC keyed hash using the SHA-256 algorithm iteratively to the user input password 504 and the random salt 506 to derive a 256-bit master key $K_{master}$:

$$K_{master} = PBKDF2(K_m, S)$$

The 256-bit master key $K_{master}$ is then processed by the HKDF split 514. The HKDF split 514 applies a hash-based key derivation function (HKDF) to the master key $K_{master}$ to split the derived key material into an encryption key $K_{enc}$ and an authentication key $K_{mac}$, collectively denoted $K_{enc}$, $K_{mac}$ in FIG. 6. The encryption key $K_{enc}$ is used to seed the PRNG 512, and the authentication key $K_{mac}$ may be used for ciphertext integrity verification. The PRNG 512 receives the encryption key $K_{enc}$ and the random nonce 508 as a combined seed ($K_{enc}$, nonce) and generates a pseudorandom byte stream using a cryptographic hash-based pseudorandom number generator based on SHA-256. The pseudorandom byte stream produced by the PRNG 512 is mapped to floating-point values in the open interval (0, 1) to initialize the control parameters 516 of the SPFC map 518. The control parameters 516 are the SPFC map initialization values $\alpha$, $\beta$, $\gamma$, $\delta$, $\varepsilon$, $\zeta$, and $y_0$, where $\alpha$, $\beta$, $\gamma$, and $\delta$ are the polynomial coefficients of the polynomial nonlinearity $P(y_n)$, $\varepsilon$ and $\zeta$ are the feedback parameters of the state-dependent feedback mechanism $\mathscr{B}(y_n)$, and $y_0$ is the initial map state.

The SPFC map 518 receives the control parameters 516 and generates the chaotic byte stream that seeds all role-specific secret keys. After initialization with the control parameters 516, an initial transient portion of the SPFC map 518 output is discarded before the usable chaotic byte stream is extracted, ensuring that the chaotic byte stream is sampled from the stationary behavior of the SPFC map 518 attractor rather than its startup transient. The SPFC map 518 outputs three independent role-specific secret keys: secret keys P1/P2 520, secret key S1/S2 522, and secret key C 524. The secret keys P1/P2 520 are the permutation control bytes assigned to the column permutation role and the row permutation role. The secret key S1/S2 522 is the substitution and bit-shift control bytes assigned to the substitution and bit-shift roles. The secret key C 524 is the diffusion seed bytes assigned to the diffusion role. The three-way role separation of the SPFC map 518 output minimizes cross-correlation among the permutation, substitution, and diffusion control signals.

The key derivation panel 526 receives the secret keys P1/P2 528, the secret key S1/S2 534, and the secret key C 540 from the key generation panel 502 and derives the specific operational keys and control sequences for each stage of the plurality of encryption operations. The secret keys P1/P2 528 correspond to the secret keys P1/P2 520 output by the key generation panel 502. From the secret keys P1/P2 528, the key derivation panel 526 derives a column permutation key (permutation key 1) $P_{col}$ 530 and a row permutation key (permutation key 2) $P_{row}$ 532, enclosed within a dashed subregion in FIG. 6. The permutation key 1 $P_{col}$ 530 is the column permutation key used in the first permutation stage 552 to permute the columns of the encoded latent image $I_e$. The permutation key 2 $P_{row}$ 532 is the row permutation key used in the second permutation stage 562 to permute the rows of the substituted latent image. Together, $P_{col}$ 530 and $P_{row}$ 532 implement the at least one permutation operation in the ordered encryption sequence.

The secret key S1/S2 534 corresponds to the secret key S1/S2 522 output by the key generation panel 502. From the secret key S1/S2 534, the key derivation panel 526 derives an S-box selection sequence $s_1$ 536 and a bit shift index $s_2$ 538. The S-box selection sequence $s_1$ 536 takes values in the set {0, 1, 2}, as labelled in FIG. 6, where each value selects one of the three cryptographic substitution boxes used in the chaotic dynamic substitution 558 of the confusion module 554. The bit shift index $s_2$ 538 takes values in the set {0, 1, . . . , 7}, as labelled in FIG. 6, specifying the number of bit positions for the circular left-shift applied to each pixel in the bit shift 566 of the diffusion module 560. The secret key C 540 corresponds to the secret key C 524 output by the key generation panel 502. From the secret key C 540, the key derivation panel 526 derives the chaotic seed matrix $C^{256\times256}$ 542. The chaotic seed matrix C 542 is a matrix of chaotic byte values arranged to correspond to the byte-domain representation used in the diffusion module 560 for implementing bit-level diffusion across the latent image representation.

The encryption panel 544 depicts the application of the plurality of encryption operations to the latent image representation produced by the PQAE 548 from the input image I 546. The input image I 546 is the digital image received by the encryption panel 544 as the plaintext input, corresponding to the input image 1102 of the digital imaging encryption module 100. The PQAE 548 is the hybrid patchwise quantum autoencoder of the digital imaging encryption module 100 that transforms the input image I 546 into the encoded latent image $I_e=\varepsilon(I)$ 550, where F denotes the quantum encoding function of the PQAE 548. The encoded latent image $I_e=\varepsilon(I)$ 550 constitutes the pre-encryption domain that serves as the input to the ordered sequence of the plurality of encryption operations in the encryption panel 544.

The encryption panel 544 comprises a permutation stage 1 552 and a confusion module 554, connected in sequence.

The permutation stage 1 552 implements the at least one permutation operation on columns and receives the encoded latent image $I_e$=ε(I) 550 as input. The permutation stage 1 552 performs a key-controlled column permutation of the encoded latent image $I_e$ using the permutation key 1 $P_{col}$ 530 derived from the key derivation panel 526, rearranging the column indices of the encoded latent image $I_e$ according to the chaotic index sequence of $P_{col}$ 530:

$$I_{ec}(:,i) = I_e(:,P_{1(i)})$$

where $P_1$ 556 is the column-permuted intermediate latent image output by the permutation stage 1 552. The permutation stage 1 552 removes horizontal spatial correlation in the encoded latent image $I_e$ with low computational overhead before the substitution step. The column-permuted intermediate latent image $P_i$ 556 is passed to the confusion module 554. The confusion module 554 implements the at least one substitution operation and comprises the chaotic dynamic substitution 558. The chaotic dynamic substitution 558 substitutes values of P1 556 using a dynamically selected substitution box controlled by the S-box selection sequence s1 ∈{0, 1, 2} derived from the key derivation panel 526. In one implementation, each 8-bit value is split into a most-significant nibble index and a least-significant nibble index for lookup in the selected substitution box, introducing key-dependent nonlinearity and confusion. The confusion module 554 produces a substituted intermediate latent image that is passed to the permutation stage 2 562.

The encryption panel 544 further comprises a permutation stage 2 562 and a diffusion module 560, connected in sequence after the confusion module 554. The permutation stage 2 562 implements the at least one permutation operation on rows and comprises a key-controlled row permutation 564. The key-controlled row permutation 564 permutes the rows of the substituted intermediate latent image using the permutation key 2 $P_{row}$ 532 derived from the key derivation panel 526, rearranging the row indices according to the chaotic index sequence of $P_{row}$ 532.

The substituted image is permuted row-wise using key P2:

$$I_{er}\cdot(i,\ :) = I_{es}\cdot(P_{2(i)},\ :)$$

where $P_2$ is the row-permuted substituted intermediate latent image output by the permutation stage 2 562. The key-controlled row permutation 564 disperses the post-substitution values across both spatial dimensions, complementing the column permutation of the permutation stage 1 552. The row-permuted substituted intermediate latent image $P_2$ is passed to the diffusion module 560. The diffusion module 560 implements the at least one diffusion operation and comprises a bit shift 566 and a bit-XOR with seed matrix 568 connected in sequence. The bit shift 566 circularly left-shifts each pixel value of $P_2$ by a key-dependent number of bit positions $s_2 \in \{0, 1, \ldots, 7\}$derived from the key derivation panel 526. The bit-XOR with seed matrix 568 then performs a bitwise exclusive-OR (XOR) of each circularly shifted pixel value with the corresponding entry of the chaotic seed matrix $C^{256\times256}$ 542, producing the encrypted representation $I_c$:

$$I_{enc} = \text{Shift}(I_{er}) \oplus C$$

where ⊗ denotes the bitwise XOR operation applied element-wise between the bit-shifted latent image and the chaotic seed matrix $C^{256\times256}$ 542. The combination of the bit shift 566 and the bit-XOR with seed matrix 568 implements bit-level diffusion that increases sensitivity of the encrypted representation Ic 570 to changes in the encoded latent image Ie. The encrypted image Ic 570 is the final output of the encryption panel 544 and constitutes the encrypted representation of the digital image produced by the quantum-assisted image encryption algorithm 500.

Figure 7:
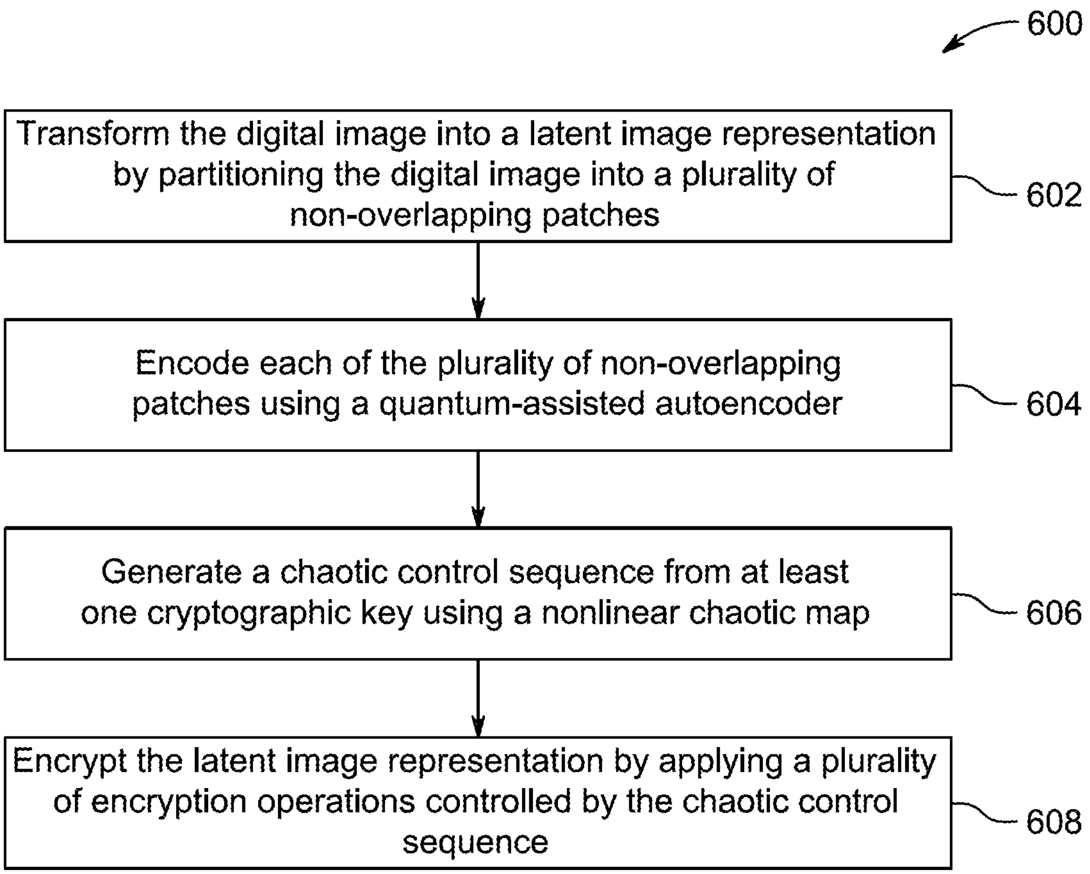
FIG. 7 is a flowchart illustrating a method for encrypting a digital image, according to certain embodiments.

FIG. 7 is a flowchart illustrating a method 600 for encrypting a digital image, according to certain embodiments. The method 600 depicts the ordered sequence of steps performed by the system 100 to transform the digital image into an encrypted representation of the digital image. The method 600 comprises four steps executed in sequence, as shown in FIG. 7.

At step 602, the method 600 includes transforming the digital image into a latent image representation by partitioning the digital image into a plurality of non-overlapping patches. The patchify module 104 of the digital imaging encryption module 100 partitions the digital image into the plurality of non-overlapping patches to prepare the digital image for latent encoding. Later the quantum-assisted autoencoder of the digital imaging encryption module 100 encodes the plurality of non-overlapping patches into the latent image representation constituting the pre-encryption domain.

At step 604, the method 600 includes encoding each of the plurality of non-overlapping patches using a quantum-assisted autoencoder. The quantum encoder 110, comprising the teacher patch autoencoder 106, the adapter layer A 108, and the parameterized quantum circuit (PQC) 112, encodes each of the plurality of non-overlapping patches into a quantum latent vector, assembles the per-patch quantum latent vectors into the latent map Z 114, and serializes the latent map Z 114 into the latent image L 116 that forms the latent image representation.

At step 606, the method 600 includes generating a chaotic control sequence from at least one cryptographic key using a nonlinear chaotic map. The SPFC encryption module 118 derives the at least one cryptographic key by applying a password-based key derivation function to a password and a salt, splits the derived key material into an encryption key Kenc and an authentication key Kmac, generates a nonce, and produces a pseudorandom byte stream using a cryptographic hash-based pseudorandom number generator to initialize and iterate the sinusoidal-polynomial feedback chaotic (SPFC) map, thereby generating the chaotic control sequence after discarding an initial transient portion of the chaotic map output.

At step 608, the method 600 includes encrypting the latent image representation by applying a plurality of encryption operations controlled by the chaotic control sequence, wherein the plurality of encryption operations comprises at least one permutation operation, at least one substitution operation, and at least one diffusion operation, thereby producing an encrypted representation of the digital image. The SPFC encryption module 118 deterministically partitions the chaotic control sequence into a first control stream for the at least one permutation operation, a second control stream for the at least one substitution operation and a bit-shift operation, and a diffusion seed matrix for the at least one diffusion operation, and applies the plurality of encryption operations in an ordered sequence comprising permuting columns of the latent image representation, substituting pixel values using a dynamically selected substitution box, permuting rows of the latent image representation, and diffusing pixel values by circularly shifting bits and performing a bitwise exclusive-OR with the diffusion seed matrix, to produce the encrypted representation Ic of the digital image.

Figure 8:
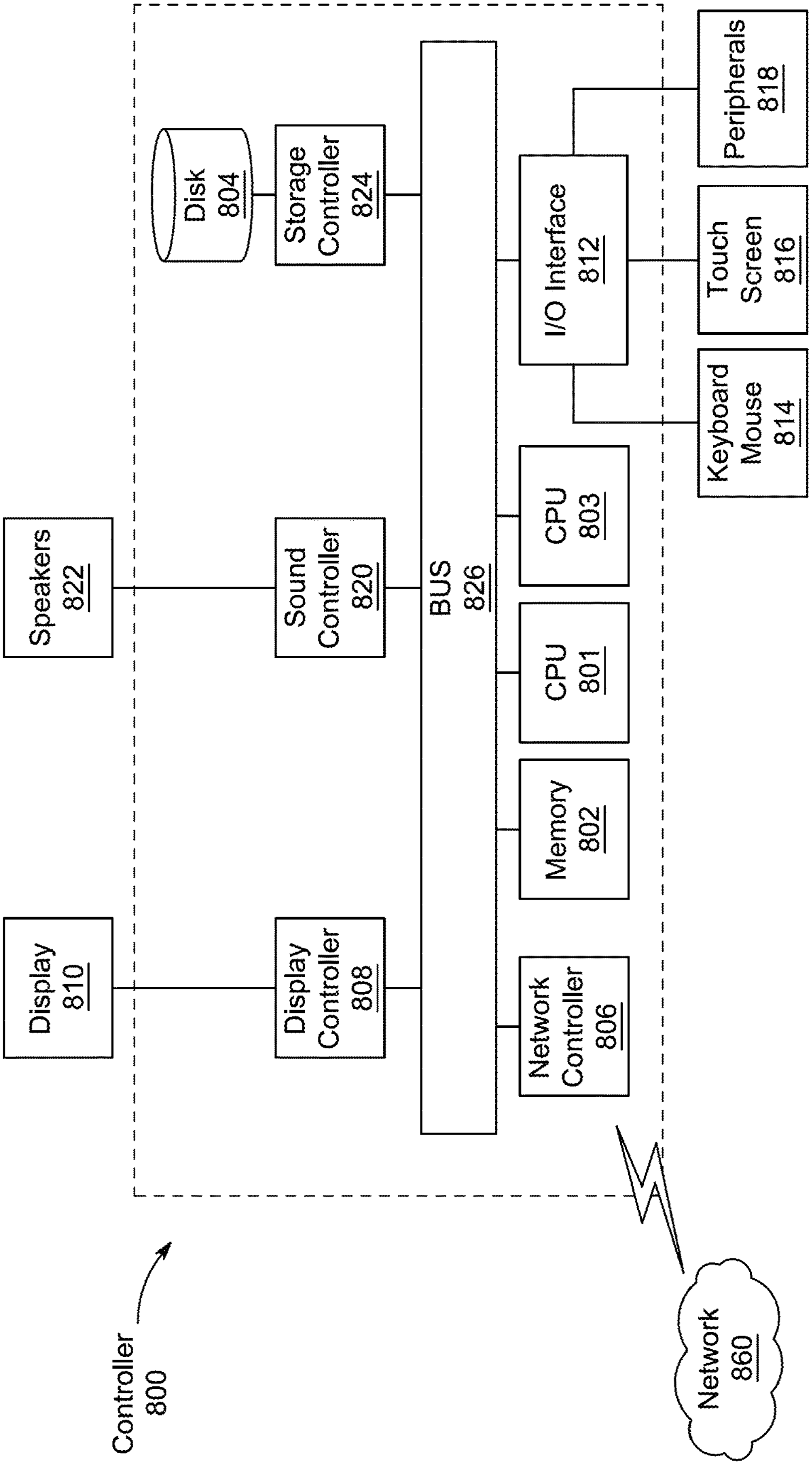
FIG. 8 is an illustration of a non-limiting example of details of computing hardware used in the computing system, according to certain embodiments.

Next, further details of the hardware description of the computing environment according to exemplary embodiments is described with reference to FIG. 8. In FIG. 8, a controller 700 is described is representative of the system in which the controller is a computing device which includes a CPU 701 (e.g., the processor of the digital imaging encryption module) which performs the processes described above/below. The process data and instructions may be stored in memory 702. These processes and instructions may also be stored on a storage medium disk 704 such as a hard drive (HDD) or portable storage medium or may be stored remotely (e.g., the memory of the digital imaging encryption module).

Further, the present disclosure is not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the present disclosure may be provided as a utility application, background daemon, or component of an operating system, or combination thereof, executing in conjunction with CPU 701, 703 and an operating system such as Microsoft Windows 7, Microsoft Windows 10, UNIX, LINUX, Apple MAC-OS and other systems known to those skilled in the art.

The hardware elements in order to achieve the computing device may be realized by various circuitry elements, known to those skilled in the art. For example, CPU 701 or CPU 703 may be a Xenon or Core processor from Intel of America or an Opteron processor from AMD of America, or may be other processor types that would be recognized by one of ordinary skill in the art. Alternatively, the CPU 701, 703 may be implemented on an FPGA, ASIC, PLD or using discrete logic circuits, as one of ordinary skill in the art would recognize. Further, CPU 701, 703 may be implemented as multiple processors cooperatively working in parallel to perform the instructions of the inventive processes described above.

The computing device in FIG. 8 also includes a network controller 706, such as an Intel Ethernet PRO network interface card from Intel Corporation of America, for interfacing with network 760. As can be appreciated, the network 760 can be a public network, such as the Internet, or a private network such as an LAN or WAN network, or any combination thereof and can also include PSTN or ISDN sub-networks. The network 760 can also be wired, such as an Ethernet network, or can be wireless such as a cellular network including EDGE, 3G, 4G, and 5G wireless cellular systems. The wireless network can also be WiFi, Bluetooth, or any other wireless form of communication that is known.

The computing device further includes a display controller 708, such as a NVIDIA GeForce GTX or Quadro graphics adaptor from NVIDIA Corporation of America for interfacing with display 710, such as a Hewlett Packard HPL2445w LCD monitor. A general purpose I/O interface 712 interfaces with a keyboard and/or mouse 714 as well as a touch screen panel 716 on or separate from display 710. General purpose I/O interface also connects to a variety of peripherals 718 including printers and scanners, such as an OfficeJet or DeskJet from Hewlett Packard.

A sound controller 720 is also provided in the computing device such as Sound Blaster X-Fi Titanium from Creative, to interface with speakers/microphone 722 thereby providing sounds and/or music.

The general purpose storage controller 724 connects the storage medium disk 704 with communication bus 726, which may be an ISA, EISA, VESA, PCI, or similar, for interconnecting all of the components of the computing device. A description of the general features and functionality of the display 710, keyboard and/or mouse 714, as well as the display controller 708, storage controller 724, network controller 706, sound controller 720, and general purpose I/O interface 712 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 9.

Figure 9:
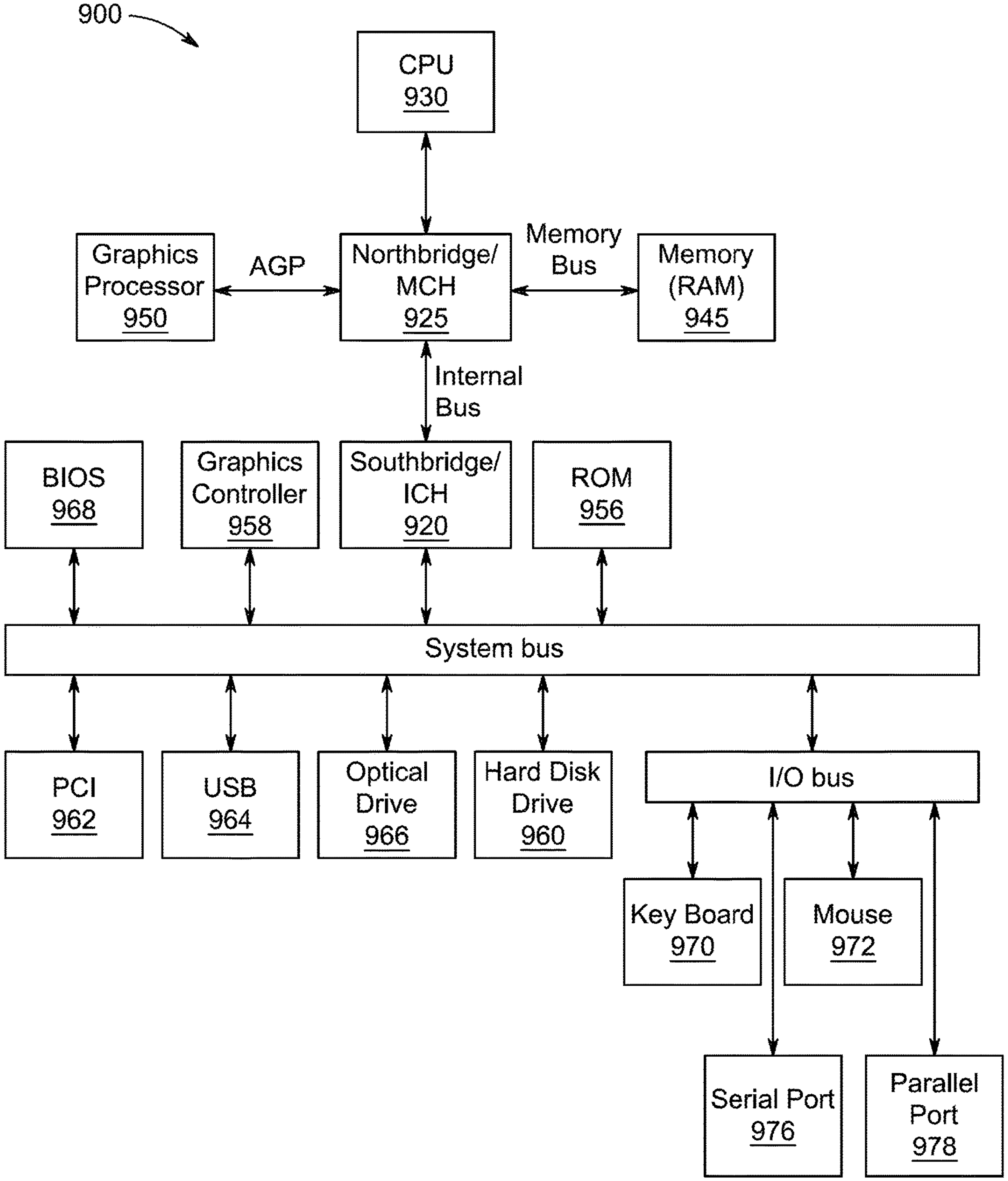
FIG. 9 is an exemplary schematic diagram of a data processing system used within the computing system, according to certain embodiments.

FIG. 9 shows a schematic diagram of a data processing system 800, according to certain embodiments, for performing the functions of the exemplary embodiments. The data processing system is an example of a computer in which code or instructions implementing the processes of the illustrative embodiments may be located.

In FIG. 9, data processing system 800 employs a hub architecture including a north bridge and memory controller hub (NB/MCH) 825 and a south bridge and input/output (I/O) controller hub (SB/ICH) 820. The central processing unit (CPU) 830 is connected to NB/MCH 825. The NB/MCH 825 also connects to the memory 845 via a memory bus, and connects to the graphics processor 850 via an accelerated graphics port (AGP). The NB/MCH 825 also connects to the SB/ICH 820 via an internal bus (e.g., a unified media interface or a direct media interface). The CPU Processing unit 830 may contain one or more processors and even may be implemented using one or more heterogeneous processor systems.

Figure 10:
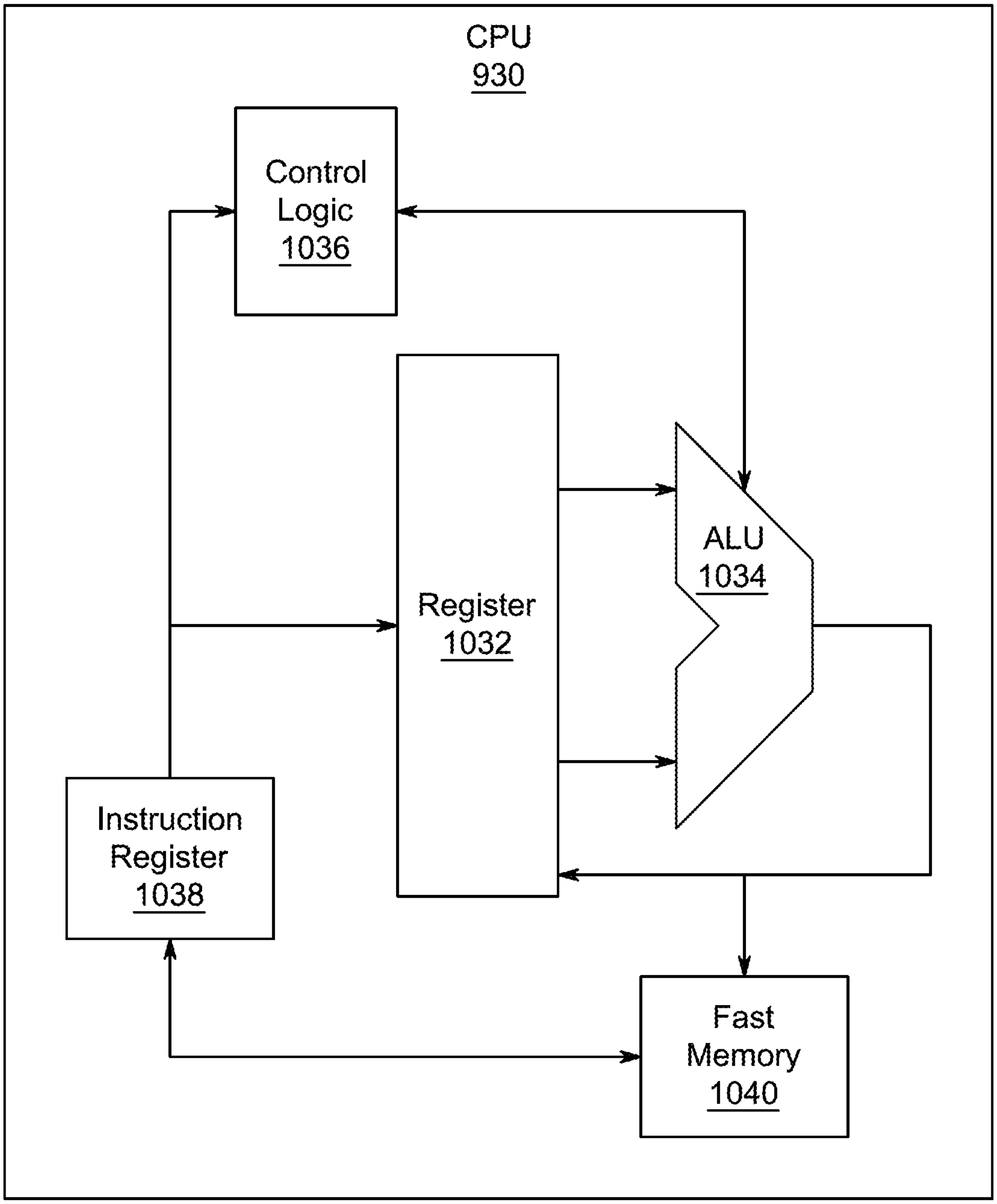
FIG. 10 is an exemplary schematic diagram of a processor used with the computing system, according to certain embodiments.

For example, FIG. 10 shows one implementation of CPU 830. In one implementation, the instruction register 938 retrieves instructions from the fast memory 940. At least part of these instructions are fetched from the instruction register 938 by the control logic 936 and interpreted according to the instruction set architecture of the CPU 830. Part of the instructions can also be directed to the register 932. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 934 that loads values from the register 932 and performs logical and mathematical operations on the loaded values according to the instructions. The results from these operations can be feedback into the register and/or stored in the fast memory 940. According to certain implementations, the instruction set architecture of the CPU 830 can use a reduced instruction set architecture, a complex instruction set architecture, a vector processor architecture, a very large instruction word architecture. Furthermore, the CPU 830 can be based on the Von Neuman model or the Harvard model. The CPU 830 can be a digital signal processor, an FPGA, an ASIC, a PLA, a PLD, or a CPLD. Further, the CPU 830 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 9, the data processing system 800 can include that the SB/ICH 820 is coupled through a system bus to an I/O Bus, a read only memory (ROM) 856, universal serial bus (USB) port 864, a flash binary input/output system (BIOS) 868, and a graphics controller 858. PCI/PCIe devices can also be coupled to SB/ICH 820 through a PCI bus 862.

The PCI devices may include, for example, Ethernet adapters, add-in cards, and PC cards for notebook computers. The Hard disk drive 860 and CD-ROM 866 can use, for example, an integrated drive electronics (IDE) or serial advanced technology attachment (SATA) interface. In one implementation the I/O bus can include a super I/O (SIO) device.

Further, the hard disk drive (HDD) 860 and optical drive 866 can also be coupled to the SB/ICH 820 through a system bus. In one implementation, a keyboard 870, a mouse 872, a parallel port 878, and a serial port 876 can be connected to the system bus through the I/O bus. Other peripherals and devices that can be connected to the SB/ICH 820 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 11:
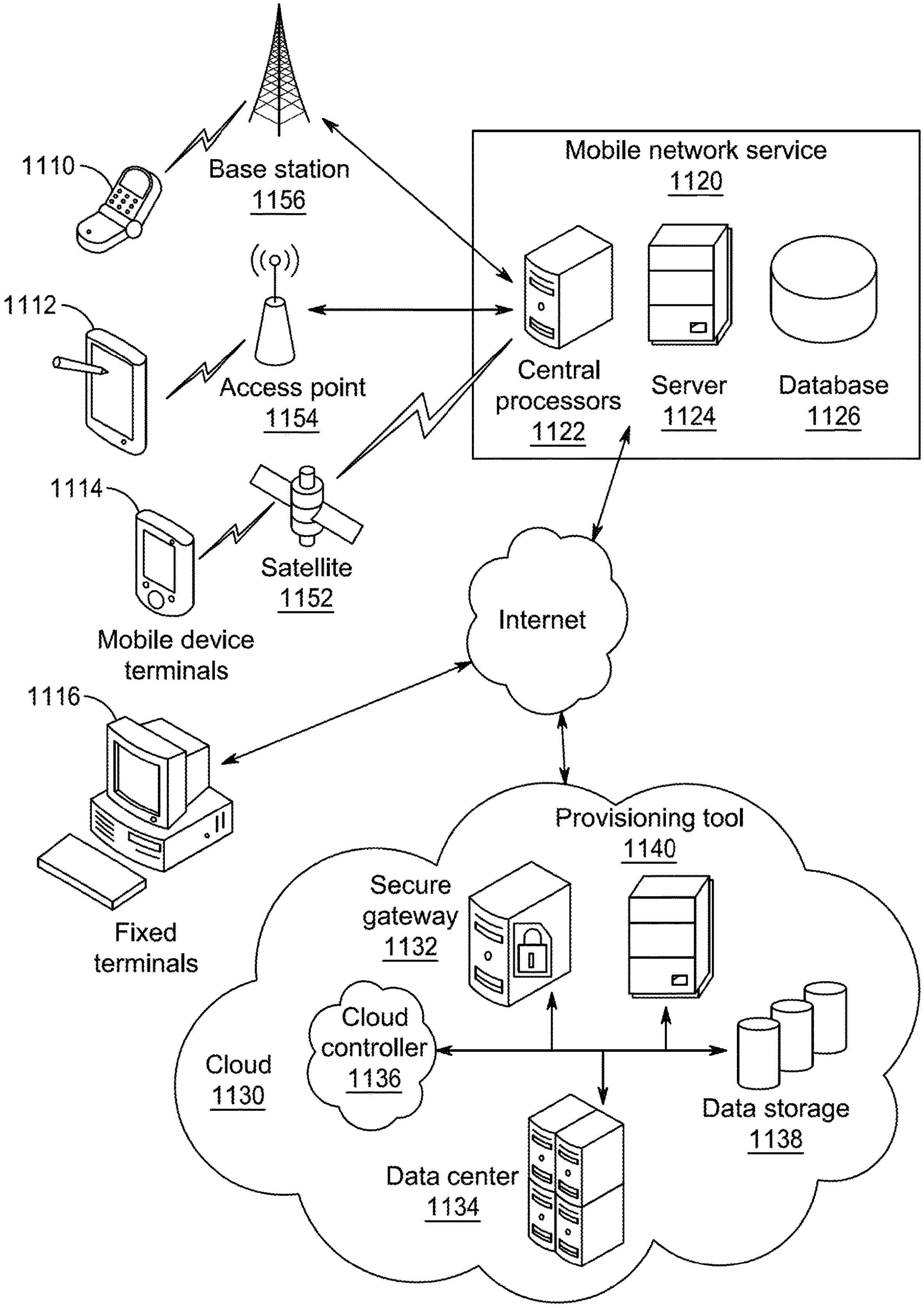
FIG. 11 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 11, in addition to various human interface and communication devices (e.g., display monitors, smart phones, tablets, personal digital assistants (PDAs)). More specifically, FIG. 11 illustrates client devices including a smart phone 1010, a tablet 1012, a mobile device terminal 1014 and fixed terminals 1016. These client devices may be commutatively coupled with a mobile network service 1020 via a base station 1056, an access point 1054, a satellite 1052 or via an internet connection. The mobile network service 1020 may comprise central processors 1022, a server 1024 and a database 1026. The fixed terminals 1016 and the mobile network service 1020 may be commutatively coupled via an internet connection to functions in cloud 1030 that may comprise a security gateway 1032, a data center 1034, a cloud controller 1036, a data storage 1038 and a provisioning tool 1040. The network may be a private network, such as the LAN or the WAN, or may be the public network, such as the Internet. Input to the system may be received via direct user input and received remotely either in real-time or as a batch process. Additionally, some implementations may be performed on modules or hardware not identical to those described. Accordingly, other implementations are within the scope that may be disclosed.

The above-described hardware description is a non-limiting example of corresponding structure for performing the functionality described herein.

Numerous modifications and variations of the present disclosure are possible in light of the above teachings. It is therefore to be understood that the invention may be practiced otherwise than as specifically described herein.

The invention claimed is:

1. A secure medical imaging system, comprising:

a medical imaging device, an adjustable patient positioning fixture, a digital imaging encryption module, and a receiving device comprising a display;

wherein the digital imaging encryption module comprises:

one or more processors; and a memory, wherein the memory stores instructions which, when executed by the one or more processors, cause the digital imaging encryption module to:

transform a digital medical image into a latent image representation by partitioning the digital medical image into a plurality of non-overlapping patches;

encoding each of the plurality of non-overlapping patches using a quantum-assisted autoencoder;

generate a chaotic control sequence from at least one cryptographic key using a nonlinear chaotic map; and encrypt the latent image representation by applying a plurality of encryption operations controlled by the chaotic control sequence, wherein the plurality of encryption operations comprises at least one permutation operation, at least one substitution operation, and at least one diffusion operation, thereby producing an encrypted representation of the digital medical image, wherein the medical imaging device, the digital imaging encryption module, and the receiving device are in wireless communication, and wherein the medical imaging device is mechanically connected to the adjustable patient positioning fixture.

2. The system of claim 1, wherein the system is further configured to: derive the at least one cryptographic key by applying a password-based key derivation function to a password and a salt, split derived key material into an encryption key and an authentication key, generate a nonce, and generate a pseudorandom byte stream using a cryptographic hash-based pseudorandom number generator.

3. The system of claim 2, wherein the system is further configured to deterministically partition the chaotic map into: a first control stream for the at least one permutation operation, a second control stream for the at least one substitution operation and a bit-shift operation, and a diffusion seed matrix for the at least one diffusion operation.

4. The system of claim 3, wherein the system is further configured to perform the plurality of encryption operations in an ordered sequence including:

permuting columns of the latent image representation using the chaotic control sequence, substituting pixel values using a dynamically selected substitution box controlled by the chaotic control sequence, permuting rows of the latent image representation using the chaotic control sequence, and diffusing pixel values by circularly shifting bits and performing a bitwise exclusive-OR with the diffusion seed matrix.

5. The system of claim 1, wherein the latent image representation comprises a structured latent image that is encrypted in place of encrypting individual pixel values of the digital medical image.

6. The system of claim 1, wherein encoding each of the plurality of non-overlapping patches comprises processing each of the plurality of non-overlapping patches with a parameterized quantum circuit to produce a latent vector.

7. The system of claim 1, wherein the quantum-assisted autoencoder is configured to separate one or more retained latent components from a plurality of discarded components and to suppress the plurality of discarded components from the latent image representation.

8. The system of claim 1, wherein the nonlinear chaotic map comprises a sinusoidal-polynomial feedback chaotic map integrating a sinusoidal modulation, a polynomial nonlinearity, a state-dependent feedback, and a modular wrapping.

9. The system of claim 1, wherein the system is further configured to discard an initial transient portion of chaotic map output prior to using the chaotic control sequence.

* * * * *